United States Patent
Cheng et al.

(10) Patent No.: US 10,178,696 B2
(45) Date of Patent: Jan. 8, 2019

(54) METHODS PROVIDING LISTEN-BEFORE-TALK AND RELATED UES AND NETWORK NODES

(71) Applicant: Telefonaktiebolaget LM Ericsson (publ), Stockholm (SE)

(72) Inventors: Jung-Fu Cheng, Fremont, CA (US); Sorour Falahati, Stockholm (SE); Stefano Sorrentino, Solna (SE); Amitav Mukherjee, Fremont, CA (US); Havish Koorapaty, Saratoga, CA (US); Daniel Larsson, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 148 days.

(21) Appl. No.: 14/917,176

(22) PCT Filed: Jan. 29, 2016

(86) PCT No.: PCT/EP2016/051897
§ 371 (c)(1),
(2) Date: Mar. 7, 2016

(87) PCT Pub. No.: WO2016/120436
PCT Pub. Date: Aug. 4, 2016

(65) Prior Publication Data
US 2016/0360553 A1    Dec. 8, 2016

Related U.S. Application Data

(60) Provisional application No. 62/110,054, filed on Jan. 30, 2015.

(51) Int. Cl.
*H04W 16/14* (2009.01)
*H04W 74/08* (2009.01)
(Continued)

(52) U.S. Cl.
CPC ....... *H04W 74/0816* (2013.01); *H04L 5/0007* (2013.01); *H04W 4/08* (2013.01);
(Continued)

(58) Field of Classification Search
CPC ...... H04L 5/0007; H04W 16/14; H04W 4/08; H04W 72/121; H04W 72/1289;
(Continued)

(56) References Cited

U.S. PATENT DOCUMENTS 8,837,422 B2    9/2014  Chen
2013/0039297 A1*  2/2013  Wang ............... H04W 76/045
                                                    370/329

(Continued)

FOREIGN PATENT DOCUMENTS

RU          2493661 C2    9/2013
WO     WO 2012/151284 A1  11/2012
(Continued)

OTHER PUBLICATIONS

3GPP, Technical Specification—"3rd Generation Partnership Project; Technical Specification Group Radio Access Network; Evolved Universal Terrestrial Radio Access (E-UTRA); Physical channels and modulation (Release 11)", 3GPP TS 36.211 V11.4.0 (Sep. 2013), 120 pp.
(Continued)

*Primary Examiner* — Asad M Nawaz
*Assistant Examiner* — Zhaohui Yang
(74) *Attorney, Agent, or Firm* — Sage Patent Group

(57) ABSTRACT

Methods of a network node may provide listen-before-talk (LBT) functionality in a telecommunications system. Such methods may include associating a user equipment (UE) within the network node's coverage to a group of UEs. In addition, a clear channel assessment (CCA) of an unlicensed
(Continued)

channel may be provided for the group of UEs. Related network nodes and UEs are also discussed.

24 Claims, 13 Drawing Sheets

(51) Int. Cl.
*H04W 72/12* (2009.01)
*H04W 4/08* (2009.01)
*H04L 5/00* (2006.01)
*H04W 74/00* (2009.01)
*H04W 84/04* (2009.01)

(52) U.S. Cl.
CPC ......... *H04W 16/14* (2013.01); *H04W 72/121* (2013.01); *H04W 74/006* (2013.01); *H04W 74/0808* (2013.01); *H04W 72/1289* (2013.01); *H04W 84/042* (2013.01)

(58) Field of Classification Search
CPC ........... H04W 74/006; H04W 74/0808; H04W 74/0816; H04W 84/042; H04W 8/18
See application file for complete search history.

(56) References Cited

U.S. PATENT DOCUMENTS

| | | | | |
|---|---|---|---|---|
| 2013/0235773 | A1* | 9/2013 | Wang | H04W 52/0206 370/311 |
| 2015/0023315 | A1* | 1/2015 | Yerramalli | H04W 74/002 370/330 |
| 2015/0049694 | A1* | 2/2015 | Choi | H04L 5/0032 370/329 |
| 2015/0319781 | A1* | 11/2015 | Damnjanovic | H04W 16/14 370/330 |
| 2015/0349931 | A1* | 12/2015 | Damnjanovic | H04L 5/0007 370/280 |
| 2016/0043841 | A1* | 2/2016 | Lunttila | H04L 5/0092 370/280 |
| 2016/0066343 | A1* | 3/2016 | Lin | H04W 72/1205 370/280 |
| 2016/0066345 | A1* | 3/2016 | Sun | H04W 74/006 370/329 |
| 2016/0249337 | A1* | 8/2016 | Liang | H04W 72/042 |
| 2017/0142737 | A1* | 5/2017 | Zheng | H04W 72/085 |

FOREIGN PATENT DOCUMENTS

| | | |
|---|---|---|
| WO | WO 2012151284 A1 | 11/2012 |
| WO | WO 2013086659 A1 | 6/2013 |
| WO | WO 2013174800 A1 | 11/2013 |

OTHER PUBLICATIONS

3GPP, Technical Specification—"3rd Generation Partnership Project; Technical Specification Group Radio Access Network; Evolved Universal Terrestrial Radio Access (E-UTRA); Physical layer procedures (Release 11)", 3GPP TS 36.213 V11.4.0 (Sep. 2013), 182 pp.

3GPP, Technical Specification—3rd Generation Partnership Project; Technical Specification Group Radio Access Network; Evolved Universal Terrestrial Radio Access (E-UTRA); Radio Resource Control (RRC); Protocol specification (Release 11), 3GPP TS 36.331 V11.5.0 (Sep. 2013), 347 pp.

International Search Report, Application No. PCT/EP2016/051897, dated Apr. 7, 2016.

Written Opinion of the International Searching Authority, Application No. PCT/EP2016/051897, dated Apr. 7, 2016.

Intel Corporation, "On the LAA uplink: scheduling, LBT, and HARQ", Agenda Item: 7.2.3.3, Document for: Discussion and Decision, 3GPP TSG RAN WG1 Meeting #80, R1-150507, Athens, Greece, Feb. 9-13, 2015, 4 pp.

Institute for Information Industry (III), "UL Transmission for LAA", Agenda Item: 7.1.3, Document for: Discussion and Decision, 3GPP TSG RAN WG2 #90, R2-152343, Fukuoka, Japan, May 25-29, 2015, 4 pp.

Russian Search Report, RU 2017130493/08(053068), dated Aug. 28, 2018, 2 pages.

* cited by examiner

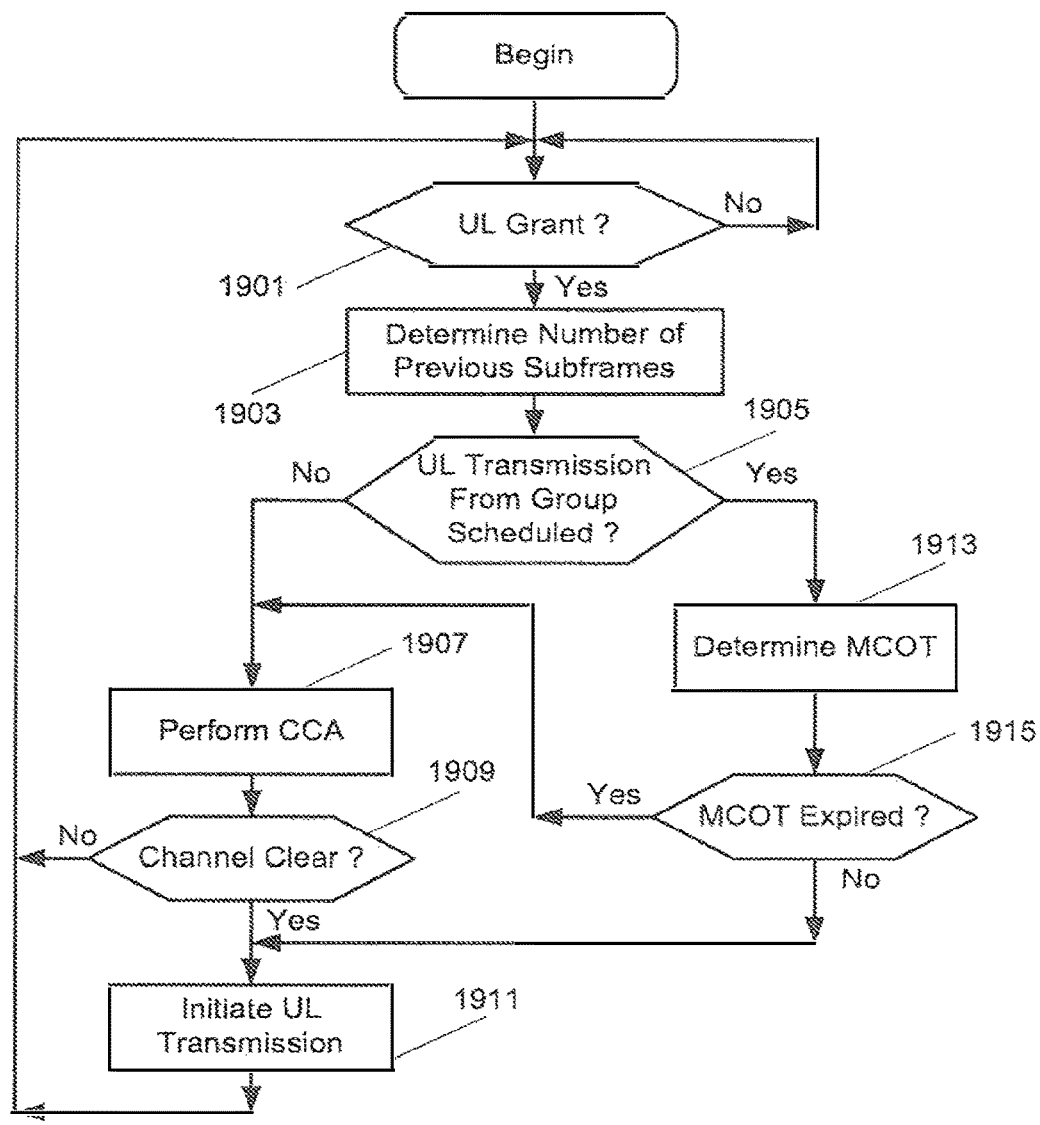

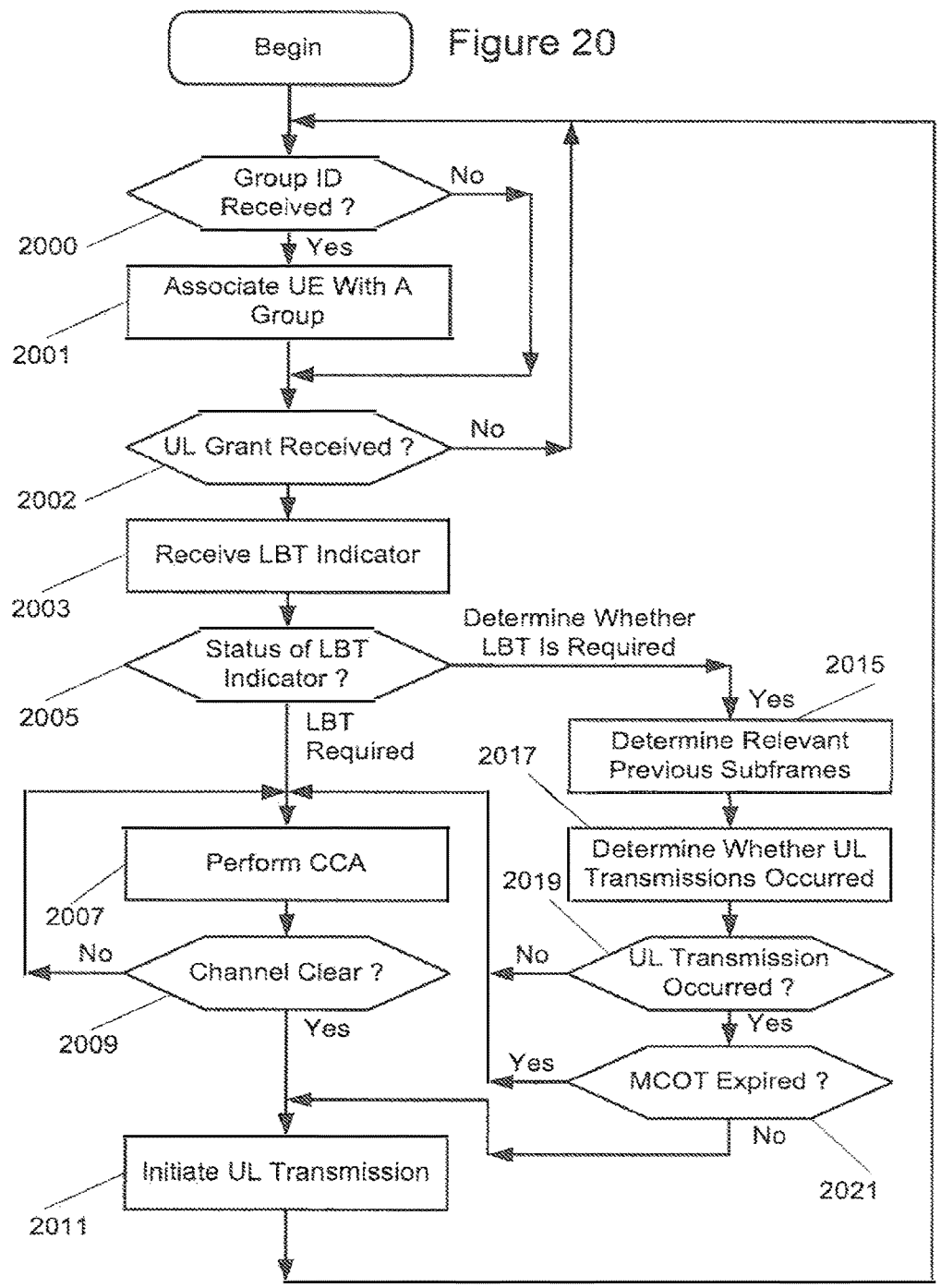

METHODS PROVIDING LISTEN-BEFORE-TALK AND RELATED UES AND NETWORK NODES

CROSS REFERENCE TO RELATED APPLICATIONS

This application is a 35 U.S.C. § 371 national stage application of PCT International Application No. PCT/EP2016/051897, filed on Jan. 29, 2016, which itself claims priority to U.S. provisional Application No. 62/110,054, filed Jan. 30, 2015, the disclosure and content of both of which are incorporated by reference herein in their entireties.

TECHNICAL FIELD

The present disclosure is directed to grouping of UEs and methods for listen-before-talk for groups of UEs in wireless communication and related network nodes and UEs.

BACKGROUND

The ongoing 3GPP Rel-13 study item "Licensed-Assisted Access" (LAA) intends to allow LTE equipment to also operate in the unlicensed 5 GHz radio spectrum. The unlicensed 5 GHz spectrum is used as a complement to the licensed spectrum. Accordingly, devices connect in the licensed spectrum (primary cell or PCell) and use carrier aggregation to benefit from additional transmission capacity in the unlicensed spectrum (secondary cell or SCell). To reduce the changes required for aggregating licensed and unlicensed spectrum, the LTE frame timing in the primary cell is simultaneously used in the secondary cell.

Regulatory requirements, however, may not permit transmissions in the unlicensed spectrum without prior channel sensing. Since the unlicensed spectrum must be shared with other radios of similar or dissimilar wireless technologies, a so called listen-before-talk (LBT) method needs to be applied. LBT involves sensing the medium for a pre-defined minimum amount of time and backing off if the channel is busy. Today, the unlicensed 5 GHz spectrum is mainly used by equipment implementing the IEEE 802.11 Wireless Local Area Network (WLAN) standard. This standard is known under its marketing brand "Wi-Fi."

Due to the LBT procedure, the first slot in which the LAA SCell or LAA User Equipment (UE) is permitted to transmit cannot be predicted in advance. This makes it difficult to pre-compute the data payload since several parameters are currently dependent on the slot number in which data is transmitted.

In the unlicensed band, a node performs LBT for accessing the channel for transmission. In downlink, an E-UTRAN Node B (eNB or eNodeB) performs LBT and upon its success, downlink transmission is permitted and can be initiated to one or multiple UEs. In uplink, different UEs perform LBT individually and hence compete with each other in accessing the unlicensed channel which may be inefficient, especially in high load systems with a large number of users each having small amounts of data to transmit, resulting in collisions and a highly congested and inefficient system. Another consequence is that if an eNB schedules two UEs simultaneously at the same time but on different physical resource blocks (PRB), those UEs would compete with each other to access the channel. Hence multi-user scheduling for uplink transmission will be problematic and inefficient.

The approaches described in the Background section could be pursued, but are not necessarily approaches that have been previously conceived or pursued. Therefore, unless otherwise indicated herein, the approaches described in the Background section are not prior art to the claims in this application and are not admitted to be prior art by inclusion in the Background section.

SUMMARY

According to some embodiments of inventive concepts, a method may be provided for listen-before-talk (LBT) functionality by a network node in a telecommunications system. A user equipment (UE) within the network node's coverage may be associated to a group of UEs. In addition, a clear channel assessment (CCA) of an unlicensed channel may be performed for the group of UEs.

According to other embodiments of inventive concepts, a method may be provided a UE for listen-before-talk (LBT) functionality, wherein the UE is included in a group of UEs in a telecommunications system. Whether an uplink transmission occurred from at least one other UE comprised in the group UEs in at least one previous subframe may be determined at the UE. Responsive to an uplink transmission having occurred from at least one other UE comprised in the group of UEs in the at least one previous subframe, an uplink transmission may be initiated from the UE comprised in the group of UEs. Responsive to no uplink transmission having occurred from at least one other UE comprised in the group of UEs in the at least one previous subframe, a clear channel assessment (CCA) of an unlicensed channel for the group of UEs may be performed before initiating an uplink transmission from the UE.

According to some other embodiments of inventive concepts, a method may be provided in a network node for listen-before-talk (LBT) functionality for a group of UEs in a telecommunications system. Information may be provided to a first one of the UEs comprised in the group of UEs whether at least a second one of the UEs comprised in the group of UEs is scheduled in a subframe prior the subframe in which the first one of the UEs comprised in the group of UEs is scheduled.

According to still other embodiments of inventive concepts, a method in a UE comprised in a group of UEs may provide listen-before-talk (LBT) functionality in a telecommunications system. The UE may determine a number of subframes previous to a subframe in which the UE is scheduled to initiate an uplink transmission with a network node. The UE may determine if at least one other UE comprised in the group of UEs is scheduled for uplink transmission in at least one of the subframes previous to the subframe in which at least one UE in the group UEs is scheduled to initiate an uplink transmission. The UE may initiate an uplink transmission from the UE using the subframe in which the UE is scheduled to initiate the uplink transmission.

According to yet other embodiments of inventive concepts, a network node may provide listen-before-talk (LBT) functionality in a telecommunications system. The network node may be adapted to associate a user equipment (UE) within coverage of the network node to a group of UEs, and perform a clear channel assessment (CCA) of an unlicensed channel for the group of UEs.

According to more embodiments of inventive concepts, a UE may provide listen-before-talk (LBT) functionality, wherein the UE is included in a group of UEs in a telecommunications system. The UE may be adapted to determine at the UE whether an uplink transmission occurred from at least one other UE comprised in the group UEs in at least one previous subframe. The UE may also be adapted to initiate an uplink transmission from the UE comprised in the group of UEs responsive to an uplink transmission having occurred from at least one other UE comprised in the group of UEs in the at least one previous subframe. The UE may further be adapted to perform a clear channel assessment (CCA) of an unlicensed channel for the group of UEs before initiating an uplink transmission from the UE responsive to no uplink transmission having occurred from at least one other UE comprised in the group of UEs in the at least one previous subframe.

According to still more embodiments of inventive concepts, a network node may provide listen-before-talk (LBT) functionality for a group of UEs in a telecommunications system. The network node may be adapted to provide information to a first one of the UEs comprised in the group of UEs whether at least a second one of the UEs comprised in the group of UEs is scheduled in a subframe prior the subframe in which the first one of the UEs comprised in the group of UEs is scheduled.

According to yet more embodiments of inventive concepts, a UE comprised in a group of UEs may provide listen-before-talk (LBT) functionality in a telecommunications system. The UE may be adapted to determine a number of subframes previous to a subframe in which the UE is scheduled to initiate an uplink transmission with a network node. The UE may also be adapted to determine if at least one other UE comprised in the group of UEs is scheduled for uplink transmission in at least one of the subframes previous to the subframe in which at least one UE in the group UEs is scheduled to initiate an uplink transmission. The UE may further be adapted to initiate an uplink transmission from the UE using the subframe in which the UE is scheduled to initiate the uplink transmission.

According to further embodiments of inventive concepts, a network node may provide listen-before-talk (LBT) functionality in a telecommunications system. The network node may include a processor configured to associate a user equipment (UE) within the network node's coverage to a group of UEs, and to perform a clear channel assessment (CCA) of an unlicensed channel for the group of UEs.

According to still further embodiments of inventive concepts, a UE may provide listen-before-talk (LBT) functionality, wherein the UE is included in a group of UEs in a telecommunications system. The UE may include a processor configured to determine at the UE whether an uplink transmission occurred from at least one other UE comprised in the group UEs in at least one previous subframe. The processor may also be configured to initiate an uplink transmission from the UE comprised in the group of UEs responsive to an uplink transmission having occurred from at least one other UE comprised in the group of UEs in the at least one previous subframe. The processor may further be configured to perform a clear channel assessment (CCA) of an unlicensed channel for the group of UEs before initiating an uplink transmission from the UE responsive to no uplink transmission having occurred from at least one other UE comprised in the group of UEs in the at least one previous subframe.

According to yet further embodiments of inventive concepts, a network node may provide listen-before-talk (LBT) functionality for a group of UEs in a telecommunications system. The network node may include a processor configured to provide information to a first one of the UEs comprised in the group of UEs whether at least a second one of the UEs comprised in the group of UEs is scheduled in a subframe prior the subframe in which the first one of the UEs comprised in the group of UEs is scheduled.

According to other embodiments of inventive concepts, a UE comprised in a group of UEs may provide listen-before-talk (LBT) functionality in a telecommunications system. The UE may include a processor configured to determine a number of subframes previous to a subframe in which the UE is scheduled to initiate an uplink transmission with a network node. The processor may also be configured to determine if at least one other UE comprised in the group of UEs is scheduled for uplink transmission in at least one of the subframes previous to the subframe in which at least one UE in the group UEs is scheduled to initiate an uplink transmission. The UE may further be configured to initiate an uplink transmission from the UE using the subframe in which the UE is scheduled to initiate the uplink transmission.

According to still other embodiments of inventive concepts, a network node may provide listen-before-talk (LBT) functionality in a telecommunications system. The network node comprising may include an associating module adapted to associate a user equipment (UE) within the network node's coverage to a group of UEs, and a performing module adapted to perform a clear channel assessment (CCA) of an unlicensed channel for the group of UEs.

According to yet other embodiments of inventive concepts, a UE may provide listen-before-talk (LBT) functionality, wherein the UE is included in a group of UEs in a telecommunications system. The UE may include a determining module adapted to determine at the UE whether an uplink transmission occurred from at least one other UE comprised in the group UEs in at least one previous subframe. The UE may also include an initiating module adapted to initiate an uplink transmission from the UE comprised in the group of UEs responsive to an uplink transmission having occurred from at least one other UE comprised in the group of UEs in the at least one previous subframe. The UE may further include a performing module adapted to perform a clear channel assessment (CCA) of an unlicensed channel for the group of UEs before initiating an uplink transmission from the UE responsive to no uplink transmission having occurred from at least one other UE comprised in the group of UEs in the at least one previous subframe.

According to more embodiments of inventive concepts, a network node may provide listen-before-talk (LBT) functionality for a group of UEs in a telecommunications system. The network node may include a providing module adapted to provide information to a first one of the UEs comprised in the group of UEs whether at least a second one of the UEs comprised in the group of UEs is scheduled in a subframe prior the subframe in which the first one of the UEs comprised in the group of UEs is scheduled.

According to still more embodiments of inventive concepts, a UE comprised in a group of UEs may provide listen-before-talk (LBT) functionality in a telecommunications system. The UE may include a first determining module configured to determine a number of subframes previous to a subframe in which the UE is scheduled to initiate an uplink transmission with a network node. The UE may include a second determining module configured to determine if at least one other UE comprised in the group of UEs is scheduled for uplink transmission in at least one of the subframes previous to the subframe in which at least one UE in the group UEs is scheduled to initiate an uplink transmission. The UE may further include an initiating module configured to initiate an uplink transmission from the UE using the subframe in which the UE is scheduled to initiate the uplink transmission.

According to some embodiments, a number of LBT attempts in an LAA system may be reduced, thereby reducing collisions and/or congestion in high load systems.

BRIEF DESCRIPTION OF THE DRAWINGS

The accompanying drawings, which are included to provide a further understanding of the disclosure and are incorporated in and constitute a part of this application, illustrate certain non-limiting embodiment(s) of inventive concepts. In the drawings:

FIGS. 16-20 are flow charts illustrating operations according to some embodiments of inventive concepts.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Figure 1:
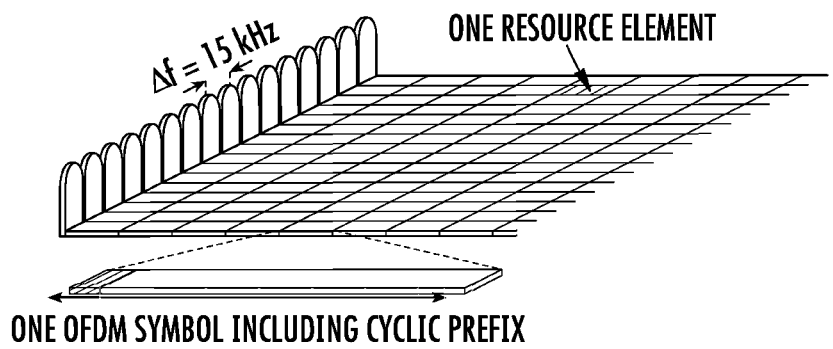
FIG. 1 is a diagram illustrating LTE downlink physical resources.
Figure 2:
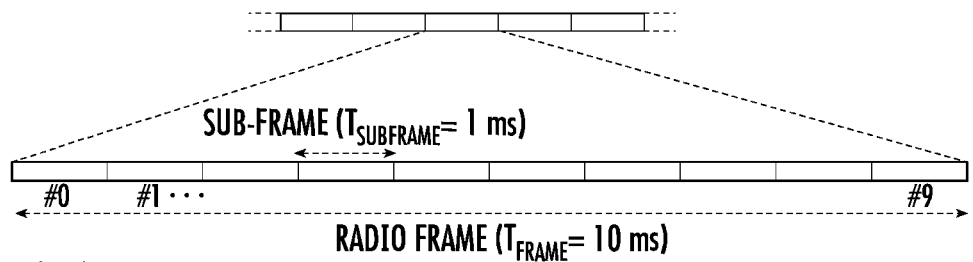
FIG. 2 is a diagram illustrating LTE time-domain structures.

LTE uses OFDM (Orthogonal frequency-division multiplexing) in the downlink and DFT-spread (Discrete Fourier Transform) OFDM (also referred to as single-carrier FDMA or Frequency Division Multiple Access) in the uplink. The basic LTE (Long Term Evolution) downlink physical resource can thus be seen as a time-frequency grid as illustrated in FIG. 1, where each resource element corresponds to one OFDM subcarrier during one OFDM symbol interval. The uplink subframe has the same subcarrier spacing as the downlink and the same number of SC-FDMA (Single Carrier FDMA) symbols in the time domain as OFDM symbols in the downlink. In the time domain, LTE downlink transmissions are organized into radio frames of 10 ms, each radio frame consisting of ten equally-sized subframes of length Tsubframe=1 ms as shown in FIG. 2. Each subframe comprises two slots of duration 0.5 ms each, and the slot numbering within a frame ranges from 0 to 19. For normal cyclic prefix, one subframe consists of 14 OFDM symbols. The duration of each symbol is approximately 71.4 μs (microseconds). Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled, i.e., in each subframe the base station transmits control information about which terminals data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of, e.g., the control information. A downlink system with CFI=3 OFDM symbols as control is illustrated in FIG. 3.

From LTE Rel-11 onwards, above described resource assignments can also be scheduled on the enhanced Physical Downlink Control Channel (EPDCCH). For Rel-8 to Rel-10, only a Physical Downlink Control Channel (PDCCH) may be available.

Figure 3:
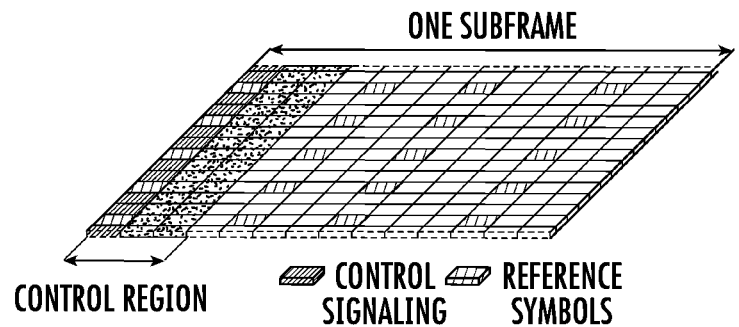
FIG. 3 is a diagram Illustrating downlink subframe structures.

The reference symbols shown in FIG. 3 are the cell specific reference symbols (CRS) and are used to support multiple functions including fine time and frequency synchronization and channel estimation for certain transmission modes.

Figure 4:
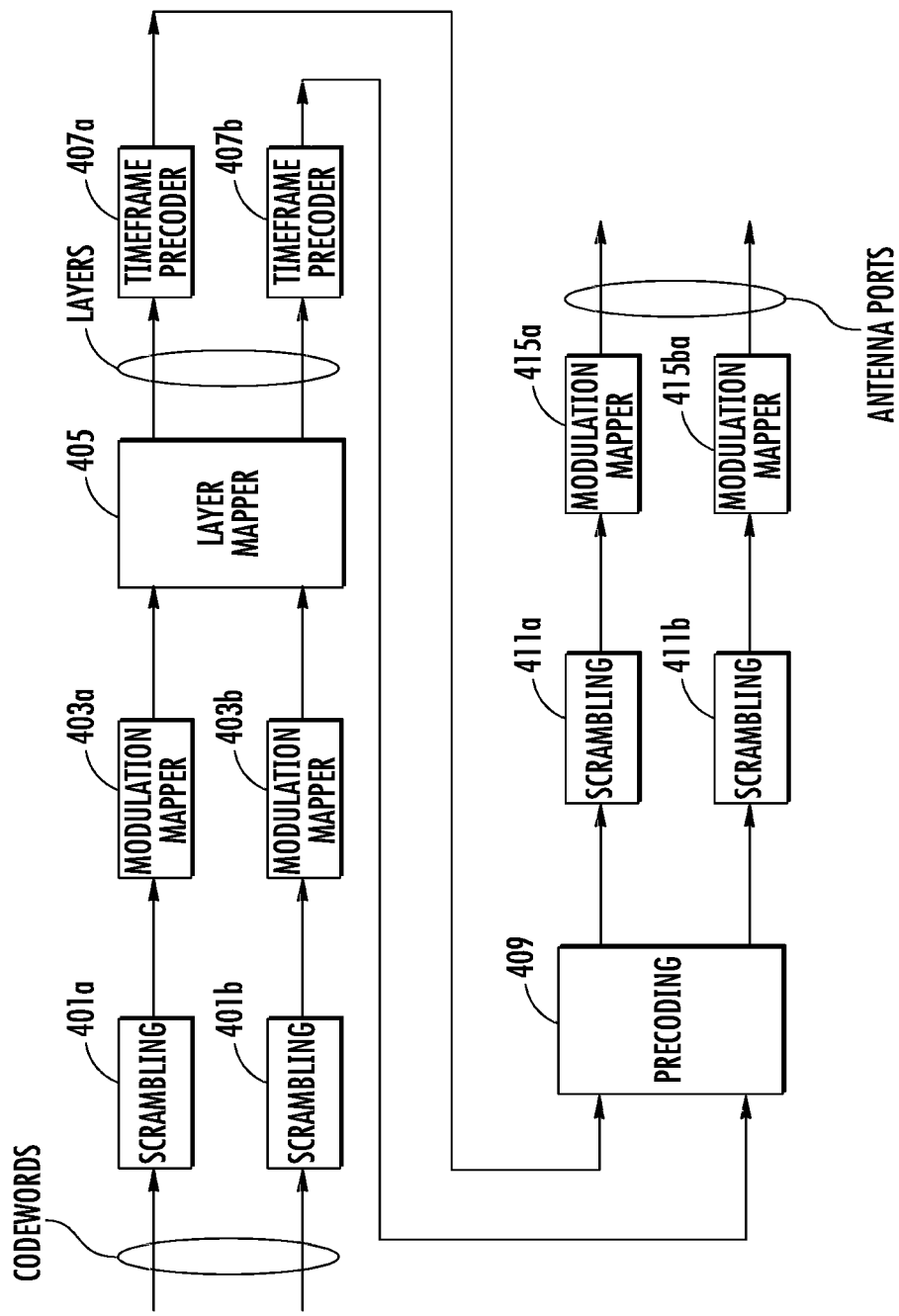
FIG. 4 is a block diagram illustrating baseband processing for an uplink.

Generation of baseband transmit signals on the physical shared channels for either the DL (DownLink) or UL (UpLink) may generally involve scrambling 401a and 401b, modulation mapping 403a and 403b, layer mapping 405, precoding 407a and 407b, RE mapping 411a and 411b, and signal generating 415a and 415b. The baseband chain for the UL PUSCH (Physical UpLink Shared Channel) is shown in FIG. 4 as an example. For PUSCH scrambling, the initialization of the scrambling sequence generator at the start of each subframe is a function of the current slot number ns. This is also true for PDSCH (Physical DownLink Shared Channel) scrambling on the DL.

Figure 5:
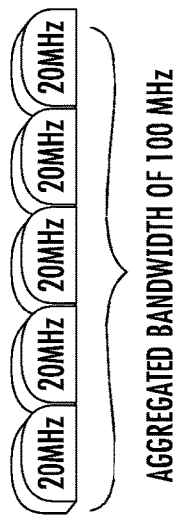
FIG. 5 is a diagram illustrating carrier aggregation with an aggregated bandwidth of 100 MHz.

The LTE Rel-10 standard supports bandwidths larger than 20 MHz. One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal (also referred to as a mobile terminal, user equipment, a user equipment node, or UE). Each such carrier can be referred to as a Component Carrier (CC). In particular, for early LTE Rel-10 deployments it can be expected that there will be a smaller number of LTE Rel-10-capable terminals compared to many LTE legacy terminals. Therefore, it may be necessary to assure an efficient use of a wide carrier also for legacy terminals, i.e. that it is possible to implement carriers where legacy terminals can be scheduled in all parts of the wideband LTE Rel-10 carrier. A straightforward way to obtain this would be by means of Carrier Aggregation (CA). CA implies that an LTE Rel-10 terminal can receive multiple CCs, where the CCs have, or at least the possibility to have, the same structure as a Rel-8 carrier. CA is illustrated in FIG. 5. A CA-capable UE is assigned a primary cell (PCell) which is always activated, and one or more secondary cells (SCells) which may be activated or deactivated dynamically.

The number of aggregated CCs as well as the bandwidth of the individual CCs may be different for uplink and downlink. A symmetric configuration refers to the case where the number of CCs in downlink and uplink is the same, whereas an asymmetric configuration refers to the case that the numbers of uplink and downlink CCs are different. It may be important to note that the number of CCs configured in a cell may be different from the number of CCs seen by a terminal. A terminal may, for example, support more downlink CCs than uplink CCs, even though the cell is configured with the same number of uplink and downlink CCs.

In addition, a feature of carrier aggregation may be the ability to perform cross-carrier scheduling. This mechanism allows a (E)PDCCH on one CC to schedule data transmissions on another CC by means of a 3-bit Carrier Indicator Field (CIF) inserted at the beginning of the (E)PDCCH messages. For data transmissions on a given CC, a UE expects to receive scheduling messages on the (E)PDCCH on just one CC—either the same CC, or a different CC via cross-carrier scheduling. This mapping from (E)PDCCH to PDSCH may also be configured semi-statically.

Figure 6:
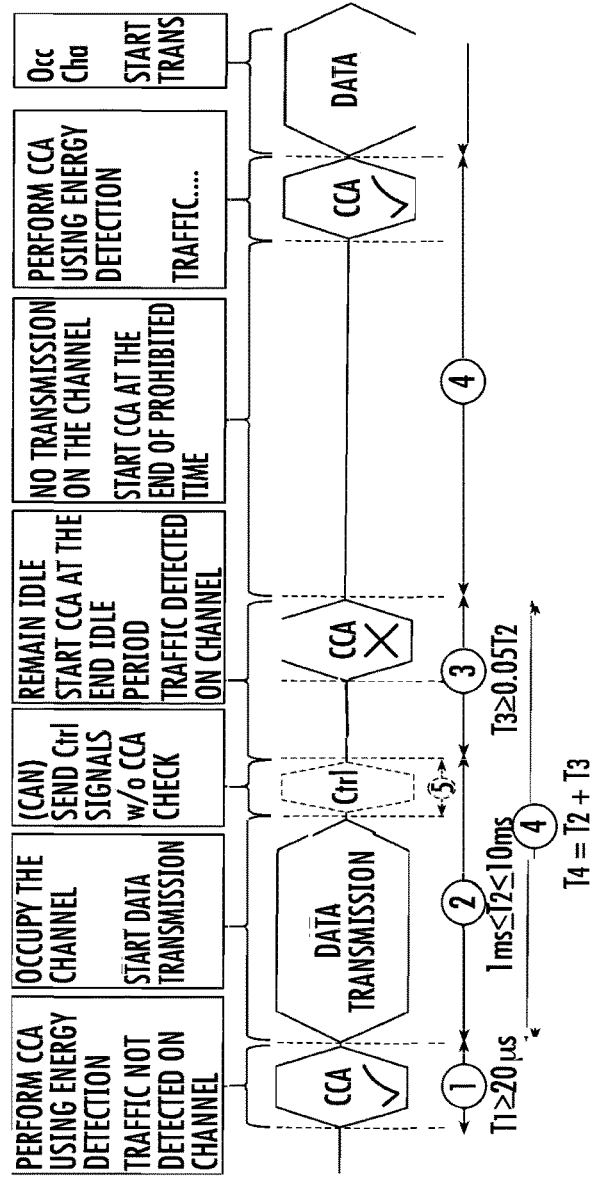
FIG. 6 is a diagram Illustrating listen before talk (LBT) operations.

In typical deployments of WLAN, carrier sense multiple access with collision avoidance (CSMA/CA) is used for medium access. This means that the channel is sensed to perform a clear channel assessment (CCA), and a transmission is initiated only if the channel is declared as Idle. In case the channel is declared as Busy, the transmission is essentially deferred until the channel is deemed to be Idle. When the range of several APs (Access Points) using the same frequency overlap, this means that all transmissions related to one AP (Access Point) might be deferred in case a transmission on the same frequency to or from another AP which is within range can be detected. Effectively, this means that if several APs are within range, they will have to share the channel in time, and the throughput for the individual APs may be severely degraded. A general illustration of the listen before talk (LBT) mechanism is shown in FIG. 6.

When transmission is desired, a terminal/node performs CCA using energy detection at block 601, and provided that traffic is not detected on the channel, the terminal/node occupies the channel and starts data transmission at block 603. At block 605, the terminal/node can send control signals without performing another CCA check because the terminal/node is allowed to occupy the channel for up to 10 ms after the CCA check of block 601 according to the example of FIG. 6. The terminal/node may remain idle at block 607 until another CCA is started at the end of the idle period. Responsive to detecting traffic on the channel during the CCA of block 607, the terminal/node refrains from transmissions over the channel over a prohibited time at block 609. Upon expiration of the prohibited time of block 609, the terminal/node may perform CCA using energy detection at block 611. Responsive to not detecting traffic on the channel at block 611, the terminal/node may occupy the channel and start data transmission at block 613.

Up to now, the spectrum used by LTE is dedicated to LTE. This has the advantage that an LTE system does not need to care about coexistence issues and spectrum efficiency can be increased/maximized. However, the spectrum allocated to LTE is limited and may not meet the ever increasing demand for larger throughput from applications/services. Therefore, a new study item has been initiated in 3GPP on extending LTE to exploit unlicensed spectrum in addition to licensed spectrum. Unlicensed spectrum can, by definition, be simultaneously used by multiple different technologies. Therefore, LTE may need to consider the coexistence issue with other systems such as IEEE 802.11 (Wi-Fi). Operating LTE in the same manner in unlicensed spectrum as in licensed spectrum can seriously degrade the performance of Wi-Fi as Wi-Fi will not transmit once it detects the channel is occupied.

Figure 7:
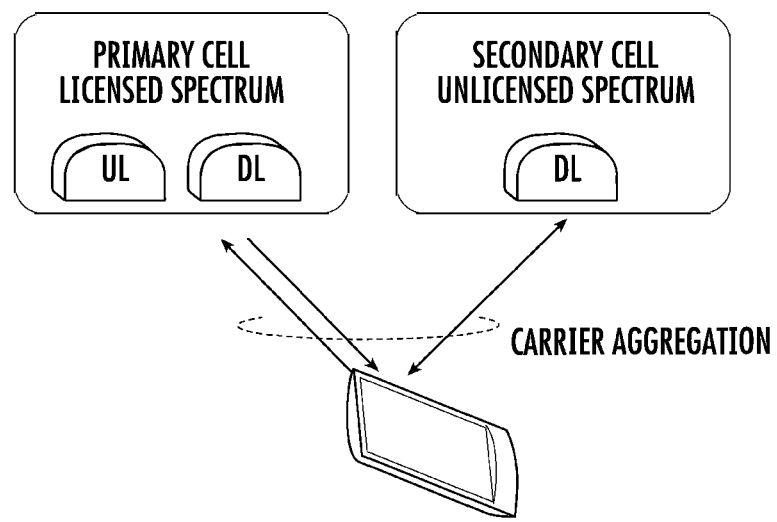
FIG. 7 is a diagram illustrating a Licensed-Assisted Access (LAA) UE using licensed and unlicensed spectrum based on LTE carrier aggregation.

Furthermore, one way to utilize the unlicensed spectrum reliably is to transmit essential control signals and channels on a licensed carrier. That is, as shown in FIG. 7, a UE may be connected to a PCell in the licensed band and to one or more SCells in the unlicensed band. In the following discussion, a secondary cell in unlicensed spectrum may be referred to as a licensed-assisted access secondary cell (LAA SCell).

Although various embodiments are disclosed herein in the context of being performed by a UE and/or a network node, they are not limited thereto and instead can be performed in any type of electronic communication device or system.

When several UEs within the same cell perform LBT on the same channel, having different UEs competing with each other for the same unlicensed channel capacity may be inefficient, and especially in high load systems where a large number of UEs are transmitting and receiving small amounts of data, there may be a risk of collision and data traffic congestion. If, for example, the eNodeB schedules two UEs simultaneously at the same time but on different physical resource blocks (PRB), those UEs may compete with each other to access the same channel, licensed or unlicensed, such as, for example, a WiFi channel.

Embodiments of the present disclosure may address one or more issues discussed above by categorizing the UEs within the coverage of an eNB into groups. The LBT attempt from a group member may be applicable to all the UEs included in the group members.

A potential advantage of one or more embodiments of the present disclosure is that collision and data congestion in high load systems may be reduced. Forming a group of UEs which makes LBT attempts for the entire group may reduce the number of LBT attempts in an LAA system.

Some embodiments may thus provide a way in which an LAA eNB (also referred to as a base station) can schedule multiple UEs on the same subframe on the same unlicensed band without any or with a reduced/minimum specification impact.

Figure 8:
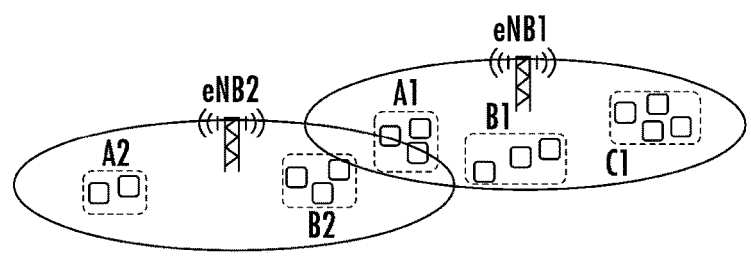
FIGS. 8-10 are diagrams Illustrating UE grouping according to some embodiments of inventive concepts.

As discussed herein, a UE may be associated with a Group of UEs. FIG. 8 schematically illustrates how UEs may be grouped into groups of UEs. In FIG. 8, eNB1 covers three groups A1, B1 and C1. Group A1 contains 3 UEs, group B1 contains 3 UEs, and Group C1 contains 4 UEs. eNB2 covers groups A2 and B2 including 2 and 3 UEs, respectively. Associating a UE to groups of UEs may be by eNB. However, embodiments disclosed herein are not limited to an eNB grouping UEs within its coverage are. The grouping of UEs to groups of UEs may in some embodiments also be done at other nodes, for example, at a UE. The number of groups per cell can range from one up to a total number equal to the number of UEs associated to that cell. An illustration of grouping UEs is shown in FIG. 8 where closely located UEs are grouped together based on their GPS (Global Positioning System) locations.

The groups of UEs can be group based on a range of different criteria. Some embodiments present a number of criteria on which grouping of UEs may be based. In some embodiments, the eNB groups UE within its coverage area. UEs can be grouped into groups of UEs based on one or more of the following embodiments:

Grouping UEs located in close proximity to each other. By retrieving physical location and/or position information of the UEs, it may be possible to group UEs that are in the same location into a group of UEs.

Grouping UEs located in a similar geographical environment. Grouping according to a similar geographical environment may include, for example, grouping UEs which are located in the same room of a building or grouping UEs which are located in the same shop.

Grouping UEs that are reporting similar RRM (radio resource management) measurements and/or interference measurements, where the RRM measurements could also be based on discovery signals.

Grouping UEs in the coverage of same remote radio heads (RRH), i.e, grouping UEs in coverage of different RRHs, connecting to the same base station, into different groups of UEs.

Grouping UEs in the coverage of the same beams, i.e. grouping UEs in coverage of different beams connecting to the same base station, into different groups.

Figure 9:
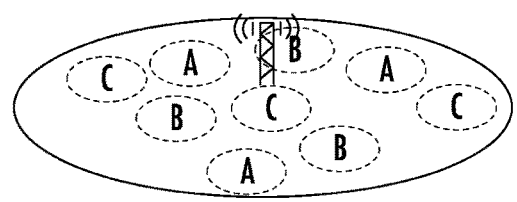

In further embodiments, groups of UEs may be assigned group identifiers (IDs), which uniquely identifying groups of UEs such that different groups of UEs would have different IDs. The ID of a group of UEs is signaled to the corresponding UEs of the group. It may be possible to reuse the group IDs such that the neighboring groups have different group IDs. One possibility is to do group ID associations based on increasing/maximizing a minimum distance between the UEs with the same ID or reducing/minimizing the resulting inter-group interference from the groups with the same ID. FIG. 9 shows examples of group associations within a cell with three group IDs, where the minimum distance between UEs with the same ID is increased/maximized.

Figure 10:
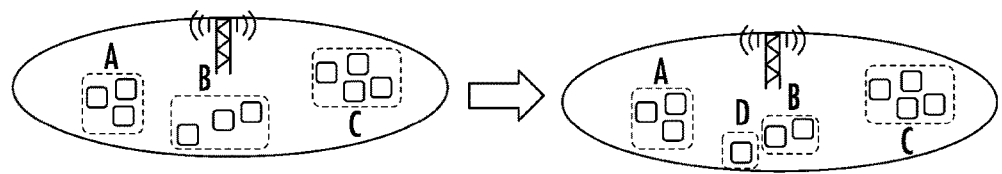

The groups can be updated during the course of operations. The update can occur due to various reasons. For example, the eNB can detect that UEs within a group are experiencing considerably different link qualities or are diverging with respect to their retransmission attempts records. These events can be a trigger to the eNB to update grouping(s) of UEs. Such embodiments are illustrated in FIG. 10, where one of the UEs in group B is dissociated or dissociates from group B and is associated to a new group D.

The groups of UEs of can also be updated based on new Channel State Information-Reference Signal (CSI-RS) based Reference Signal Receive Power (RSRP) measurements obtained based on the CSI-RS in the discovery signal. All the UEs that report a certain CSI-RS associated with the PSS (Primary Synchronization Signal) and SSS (Secondary Synchronization Signal) associated with the cell as being the one with the highest signal strength can be assigned to be part of a group.

The group ID may be signaled to UEs in the group by the serving eNB. In some embodiments, the group ID is signaled via physical layer signaling such as a DCI (Downlink Control Information) format. One possibility is to use an existing DCI format such as DCI format 0 where the Cyclic shift for Demodulation Reference Signals (DMRS) and OCC (Orthogonal Cover Code) index (3 bits) can be used to differentiate different groups within the same cell or within a transmission point (TP) coverage area in case of shared cell deployment. Another possibility is to define a new DCI format to signal the group ID to the UEs. In further embodiments, the group ID can be signaled to UEs via the eNB operating in unlicensed band or its corresponding PCell in the licensed band in case of CA between licensed and unlicensed band carriers.

In embodiments described above, an LBT attempt from a UE may be applicable to all or most of the UEs included in the group of UE members under some constraints. In the following embodiments, the constraint is assumed to be that a maximum channel occupancy time after successful LBT. In an illustrative example, a maximum channel occupancy time of 4 ms is used. Such embodiments, however, may be applicable also to other values of the maximum channel occupancy time.

Figure 11:
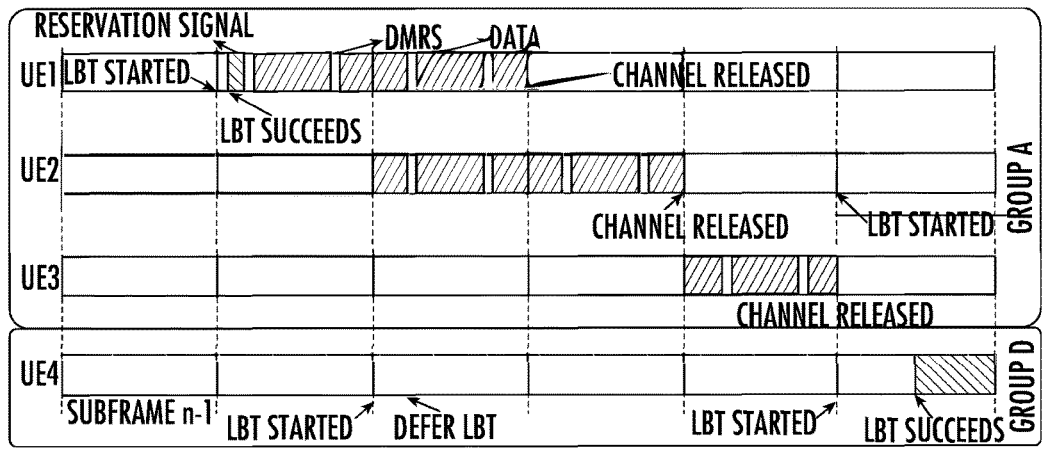
FIG. 11 is a diagram Illustrating group LBT for scheduling assignments according to some embodiments of inventive concepts.

Table 1 presents an example of scheduling assignments for UEs in groups A and D in FIG. 10. FIG. 11 illustrates how collisions and competition is reduced/avoided for UEs included in a group of UEs for which a common LBT is performed. The eNB is able to schedule UEs from the same group at the same time unit without collisions. FIG. 11 shows that UE2 and UE3 do not perform a LBT prior to transmission because, firstly, it is determined that another UE from the same group of UEs (i.e., UE1) has already acquired the channel access (UE1 in case of UE2 and UE2 in case of UE3) and, secondly, the group has not yet reached its maximum channel occupancy time. The group releases the channel after it has reached the maximum channel occupancy time of 4 ms (done by UE 3).

TABLE 1

Examples of scheduling assignments (SA) and corresponding PUSCH transmission (if permitted) for the UEs in groups A and D illustrated in FIG. 10. Note that PUSCH for UE1 and UE2 of the same group are scheduled during the same subframe n + 1.

| | | Subframe index | | | | | | | | |
|---|---|---|---|---|---|---|---|---|---|---|
| | | n − 4 | n − 3 | n − 2 | n − 1 | n | n + 1 | n + 2 | n + 3 | n + 4 |
| Group A | UE1 | SA | — | — | — | PUSCH | PUSCH | — | — | — |
| | UE2 | — | SA | SA | — | SA | PUSCH | PUSCH | — | PUSCH |
| | UE3 | — | — | — | SA | — | — | — | PUSCH | — |
| Group D | UE4 | — | SA | — | — | — | PUSCH | — | — | PUSCH |

In further embodiments, additional information can be signalled to UEs included in a group of UEs. The group additional information may be signalled to UEs by eNB via physical layer signalling such as a DCI format. Alternatively, existing DCI format or a new DCI format may be used. Furthermore, the additional group information may be signalled to UE via the eNB operating in unlicensed band or its corresponding PCell in the licensed band in case of CA between licensed and unlicensed band carriers. Availability of such information may be optional. Additional information may be signalled together with the group ID. The information can be provided using a bit-map. For example, if DCI format 0 is used to signal the group ID, the zero padding bits can be used for this purpose if they are available. Another or new DCI format can be considered for signalling this information to the UE.

Illustrative examples of additional group information may include a group scheduling history where the eNB informs a group if any UE of that group is scheduled in the previous subframes. Further illustrative examples of additional group information may include one or more of the following:

- a maximum channel occupancy time on the unlicensed band may be 4 ms
- a group scheduling history may be transmitted at subframe n−4 for scheduled
- PUSCH transmissions in subframe n for example via DCI format 0.
- Use Nh bits for group scheduling history, {b0, . . . , bNh−1}
  - Group scheduling history informs a UE on the lack or presence of scheduling assignments of the group UEs in Nh subframe(s) prior to subframe n
  - Nh=1 to N_hmax where Nh_max=3 for maximum channel occupancy of 4 ms
  - bk=0 for k=0, . . . , Nh−1, means that no UE of the group is scheduled in subframe n−(k+1)
  - bk=1 for k=0, . . . , Nh−1, means that at least one UE of the group is scheduled in subframe n−(k+1)
  - Nh=1 and b0=0 means:
    - In subframe n−1 no UEs of the group is scheduled.
  - Nh=2, and (b0,b1)={1,0} means:
    - In subframe n−1 at least a UE of the group is scheduled.
    - In subframe n−2 no UEs of the group is scheduled.
  - Nh=3, and {b0,b1,b2}={0,1,1} means
    - In subframe n−1 no UEs of the group is scheduled.
    - In subframe n−2 at least a UE of the group is scheduled.
    - In subframe n−3 at least a UE of the group is scheduled.

The eNB directly informs the UE if it has to perform the LBT operation irrespective of the possible transmission by the group members. This can be done by using a single bit where if it is zero, it indicates to the UE that is has to perform LBT for PUSCH transmission in subframe n. If it is one the UE has to perform additional operations to determine whether LBT is needed or not as described below. The latter case where the single information bit is equal to one is equivalent to the case that the UE is not provided with additional group information or the provided information does not assist the UE.

UE procedures may be provided to enable group base LBT. The UE procedure described in this paragraph may enable group based LBT where a UE capable of group based LBT can make the decision whether to perform LBT for PUSCH transmission when it is scheduled or transmit the PUSCH without LBT. In the following non-limiting exemplary embodiments, it is assumed that the LBT is performed at the beginning of the subframe. Other embodiments may use other LBT starting positions.

UE procedures may be provided to enable group based LBT with a conditioned scheduler at the eNB. If the eNB scheduler is constrained based on some conditions or regulations with respect to the operation in the unlicensed band, the UE can utilize this scheduler property to make a decision to perform LBT for a scheduled PUSCH at a corresponding subframe (SF). The decision is described as follows:

Decision: Make decision for SF n:
  Do LBT for PUSCH transmission in SF (subframe) n
  Skip LBT and transmit PUSCH in SF (subframe) n Prior to the granted UL transmission for UEs included in a group of UEs, the eNB performs the LBT to acquire access to the channel for downlink transmissions. If the eNB succeeds in LBT, any UE included in the group of UEs with UL grant authorized by that eNB in the subsequent subframes within the limit of the maximum channel occupancy time can skip the LBT and perform the PUSCH transmission in the scheduled subframe. For example, assuming a maximum channel occupancy time of 4 ms, if a UE is scheduled for PUSCH transmission in subframe n and the UE observes downlink transmission by its eNB or any UL transmission by any of the UEs in its group in any three previous subframes (i.e. subframes n−3, n−2, n−1), the UE can start PUSCH transmission in subframe n without performing LBT. Otherwise it has to perform LBT.

The scheduler schedules the UEs belonging to the same group in the time interval not exceeding the maximum channel occupancy time. The UE which is scheduled for PUSCH transmission in subframe n may only need to monitor if there is data transmission by any group member at the previous subframe, i.e. subframe n−1. If the UE finds out that there has been data transmission by any group member at subframe n−1, the UE can skip LBT and transmit PUSCH in subframe n. Otherwise, the UE may have to perform LBT for PUSCH transmission in subframe n.

The eNB can also provide the UE with one bit of information as the group based LBT indicator to save the UE from unnecessary monitoring. This bit indicates to the UE whether any other UE from the same group of UEs is scheduled in the subframe prior to the subframe in which the UE is scheduled. If the bit indicates that no UE from the group is scheduled in the subframe n−1 for a scheduled PUSCH transmission in subframe n, the UE may have to perform LBT for PUSCH transmission in subframe n. Otherwise the UE may need to monitor if there is data transmission by any group member at the previous subframe, i.e. subframe n−1. If the UE finds out that there has been data transmission by any group member at subframe n−1, the UE can skip LBT and transmit PUSCH in subframe n. Otherwise, the UE may have to perform LBT for PUSCH transmission in subframe n.

Note that in the above embodiment, the UE is not required to be aware of the maximum channel occupancy time. That information may only be used at the eNB and can vary. Note also that different groups can be scheduled in the same subframe by the same eNB.

Figure 12:
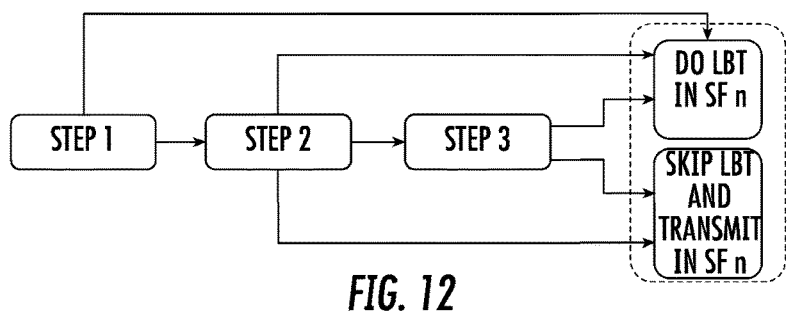
FIG. 12 is a block diagram illustrating UE procedures according to some embodiments of inventive concepts.

UE procedures may be provided to enable group based LBT with an unconditioned scheduler at the eNB. If the eNB scheduler is not constrained based on some conditions or regulations with respect to the operation in the unlicensed band, the procedure for a UE decision to perform LBT for a scheduled PUSCH at subframe n may depend on three steps. In some embodiments, the decision to perform LBT may include: only performing step 1; only performing step 2; only performing step 3; only performing step 1 and step 2; only performing step 1 and step 3; or only performing step 2 and 3. The decision is described as the follows:

Decision: Make decision for SF n:
    Do LBT for PUSCH transmission in SF (subframe) n
    Skip LBT and transmit PUSCH in SF (subframe) n The transition between these steps is illustrated in FIG. 12, and the description of UE procedures at each step is provided as discussed below.

Step 1: In this step, the UE determines the indices of subframes to be monitored in Step 2 before subframe n in order to decide if LBT can be discarded in subframe n.

This can be done based on the additional signaling information such as group scheduling history or group based LBT indicator. The UE can determine based on such information if it has to perform LBT or if it has the possibility of discarding LBT. For the latter case, the UE may need to perform additional processing by monitoring one or multiple subframes prior to the scheduled subframe at Step 2 as described below. Moreover, if such information is not available, the UE may have to go to step 2 and consider monitoring the last Nh_max subframes.

Note that the information from eNB on the presence of scheduling grant for a subframe does not directly imply that PUSCH transmission has occurred in that subframe due to LBT. Hence, the monitoring step may be needed.

Some examples are provided in Table 2, Table 3 and Table 4.

Step 2: In this step, the UE determines if any group member has transmitted data in the subframe(s) that are supposed to be monitored.

This can be done at UE, for example, by correlating the signal carrying the group ID (for example, UL DMRS with the group ID) and the received signals at the occasions where the similar signal is expected from other members in the same group (for example, in case of UL DMRS that would be the received signal in OFDM symbols 4 and 11 in case of normal cyclic prefix).

The UE does not necessarily need to monitor all the subframes that were determined in Step 1 to be monitored. For example, if the UE determines that in subframe n−1 there is no transmission from any group member it can directly decide that it has to perform LBT in subframe n.

If the UE finds out that data transmission by group members has occurred in all the previous Nh_max subframes it may have to go to Step 3 to determine if the group has occupied the channel for the maximum channel occupancy time or not. If not, the UE can skip LBT and perform transmission. Otherwise the UE may have to perform LBT.

An example is provided in Table 5.

Step 3: In this step, the UE determines if the group has occupied the channel for the maximum channel occupancy time by, for example, detecting if the group members have transmitted data partially in the subframe or utilized the whole subframe for data transmission.

Detecting whether there is a partial or full data transmission in a subframe assists the UE to identify if the subframe is the first subframe within the maximum channel occupancy time or not, respectively. If partial data transmission in a subframe has occurred, it may indicate that immediately before data transmission in that subframe LBT has been performed and part of the subframe is consumed for corresponding CCA operations. Hence, that subframe can be accounted as the first subframe in the maximum channel occupancy time duration that is occupied by the group. If complete data transmission in a subframe has occurred, it may indicate that no LBT and corresponding CCA operation has been performed in that subframe. Hence, that subframe cannot be the first subframe within the maximum channel occupancy time duration. If by other means the UE determines that it is the last one, then the UE may have to perform LBT for data transmission after that subframe since the maximum channel occupancy time has expired. If by other means the UE determines that is it not the last, then the UE assumes that it may be able to skip the LBT procedure for data transmission after that subframe.

This can be done at UE, for example, by performing energy detection at the beginning of the subframe for one or two CCA slots. In case of detecting low energy, it means a UE within a group was doing LBT, and if there is data in that subframe, that would be partial. By detecting reasonably high energy, it means that if a UE from that group has transmitted data that should be a full subframe.

This step is only required when step 2 indicates the presence of the group transmissions in all the subframes prior to the scheduled subframe.

The UE does not necessarily need to detect the presence of partial data in all the subframes that were determined in Step 2. For example, if the UE determines that in subframe n−1 there is partial data transmission from any group member, it can directly decide that it can discard LBT and transmit PUSCH in subframe n without LBT.

An example is provided in Table 6.

| Step 1 for maximum channel occupancy of 4 ms and 3 bits group scheduling history | | | |
|---|---|---|---|
| b2 | b1 | b0 | Action in Step 1 |
| 0 | 0 | 0 | Do LBT |
| 0 | 0 | 1 | Go to Step 2: Monitor SF n − 1 |
| 0 | 1 | 0 | Do LBT |
| 0 | 1 | 1 | Go to Step 2: Monitor SFs n − 1, n − 2 |
| 1 | 0 | 0 | Do LBT |
| 1 | 0 | 1 | Go to Step 2: Monitor SF n − 1 |
| 1 | 1 | 0 | Do LBT |
| 1 | 1 | 1 | Go to Step 2: Monitor SFs n − 1, n − 2, n − 3 |

Table 2 is provided above to illustrate a relation between the group scheduling history and corresponding action in Step 1 for maximum channel occupancy of 4 ms and 3 bits group scheduling history according to some embodiments of inventive concepts.

| Step 1 for maximum channel occupancy of 4 ms and 2 bits group scheduling history | | |
|---|---|---|
| b1 | b0 | Action in Step 1 |
| 0 | 0 | Do LBT |
| 0 | 1 | Go to Step 2: Monitor SF n − 1 |
| 1 | 0 | Do LBT |
| 1 | 1 | Go to Step 2: Monitor SFs n − 1, n − 2, n − 3 |

Table 3 is provided above to illustrate a relation between the group scheduling history and corresponding action in Step 1 for maximum channel occupancy of 4 ms and 2 bits group scheduling history according to some embodiments of inventive concepts.

| Step 1 for maximum channel occupancy of 4 ms and 1 bits group scheduling history or 1 bit group based LBT indicator | |
|---|---|
| b0 | Action in Step 1 |
| 0 | Do LBT |
| 1 | Go to Step 2: Monitor SF n − 1, n − 2, n − 3 |

Table 4 is provided above to illustrate a relation between the group scheduling history and corresponding action in Step 1 for maximum channel occupancy of 4 ms and 1 bits group scheduling history according to some embodiments of inventive concepts.

| Step 2 for group transmission detection in the subframes to be monitored from Step 1 where 0 and 1 correspond to lack and presence of group transmission in a monitored subframe, respectively | | | |
|---|---|---|---|
| n − 3 | n − 2 | n − 1 | Action in Step 2 |
| 0 | 0 | 0 | Do LBT |
| 0 | 0 | 1 | Skip LBT |
| 0 | 1 | 0 | Do LBT |
| 0 | 1 | 1 | Skip LBT |
| 1 | 0 | 0 | Do LBT |
| 1 | 0 | 1 | Skip LBT |
| 1 | 1 | 0 | Do LBT |
| 1 | 1 | 1 | Go to Step 3 |

Table 5 is provided above to illustrate a relation between the group transmission detection in the subframes to be monitored from Step 1 and corresponding actions in Step 2 according to some embodiments of inventive concepts.

| Step 3 for partial data detection in a subframe where 0 and 1 correspond to full and partial data transmission in the subframe, respectively. | | | |
|---|---|---|---|
| n − 3 | n − 2 | n − 1 | Action in Step 3 |
| 0 | 0 | 0 | Do LBT |
| 0 | 0 | 1 | Skip LBT |
| 0 | 1 | 0 | Skip LBT |
| 0 | 1 | 1 | Skip LBT |
| 1 | 0 | 0 | Skip LBT |
| 1 | 0 | 1 | Skip LBT |
| 1 | 1 | 0 | Skip LBT |
| 1 | 1 | 1 | Skip LBT |

Table 6 is provided above to illustrate a relationship between the partial data transmission detection in the subframes and the corresponding actions according to some embodiments of inventive concepts.

For purposes of illustration and explanation only, embodiments of inventive concepts are described herein in the context of operating in a RAN (Radio Access Network) that communicates over radio communication channels with UEs (also referred to as user equipments, user equipment nodes, wireless terminals, mobile terminals, wireless devices, etc.). It will be understood, however, that inventive concepts are not limited to such embodiments and may be embodied generally in any type of communication network. As used herein, a legacy or non-legacy wireless terminal (also referred to as a UE, user equipment, user equipment node, mobile terminal, wireless device, etc.) can include any device that receives data from and/or transmits data to a communication network, and may include, but is not limited to, a mobile telephone ("cellular" telephone), laptop/portable computer, pocket computer, hand-held computer, an M2M device, IoT (Internet of Things) device, and/or desktop computer.

Note that although terminology from 3GPP (3rd Generation Partnership Project) LTE (Long Term Evolution) has been used in this disclosure to provide examples of embodiments of inventive concepts, this should not be seen as limiting the scope of inventive concepts to only the aforementioned system. Other wireless systems, including WCDMA, WiMax, UMB and GSM, may also benefit from exploiting ideas/concepts covered within this disclosure.

Also, note that terminology such as eNodeB (also referred to as a base station, eNB, etc.) and UE (also referred to as user equipment, user equipment node, wireless terminal, mobile terminal, wireless device, etc.) should be considering non-limiting.

Figure 13:
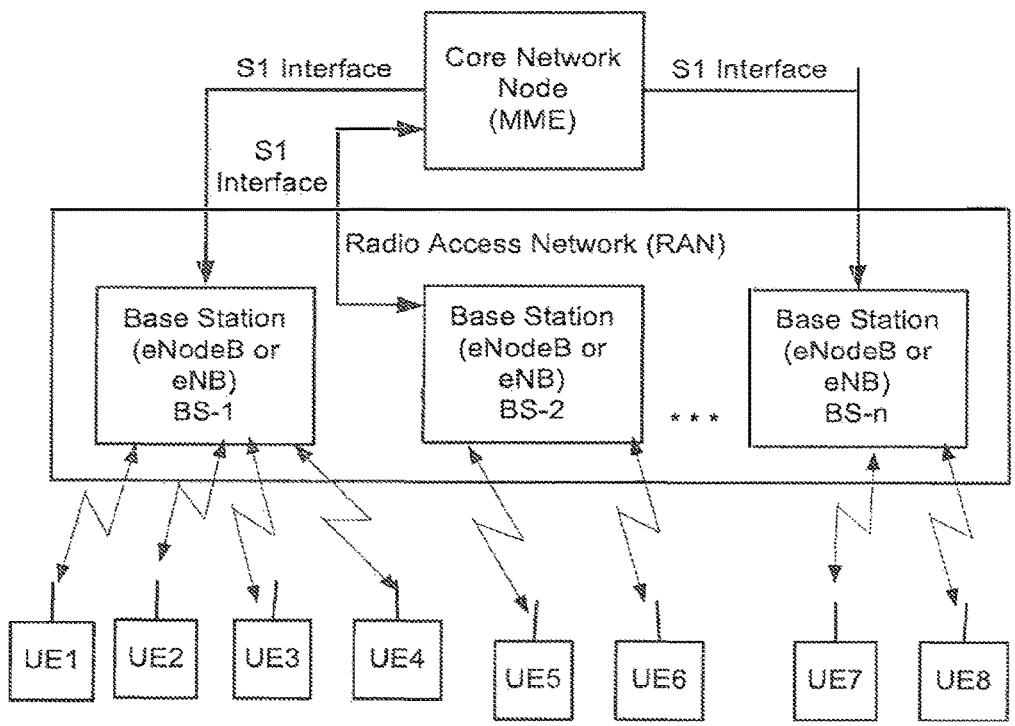
FIG. 13 is a block diagram illustrating radio access networks according to some embodiments of inventive concepts.

FIG. 13 is a block diagram illustrating a Radio Access Network (RAN) according to some embodiments of present inventive concepts. As shown, communications between base stations and one or more core network nodes (e.g., Mobility Management Entity MME or Service GPRS Support Node SGSN) may be provided using respective S1 interfaces. Each base station BS may communicate over a radio interface (including uplinks and downlinks) with respective wireless terminals UEs in a respective cell or cells supported by the base station. By way of example, base station BS-1 is shown in communication with wireless terminals UE1, UE2, UE3, and UE4, base station BS-2 is shown in communication with wireless terminals UE5 and UE6, and base station BS-n is shown in communication with wireless terminals UE7 and UE8.

Figure 14:
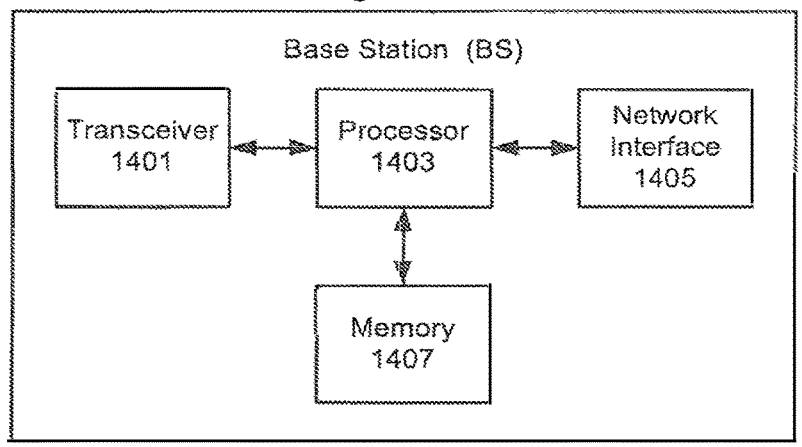
FIG. 14 is a block diagram illustrating a base station of FIG. 13 according to some embodiments of inventive concepts.

FIG. 14 is a block diagram illustrating elements of a base station BS of FIG. 13. As shown, a base station BS may include a transceiver circuit 1401 (also referred to as a transceiver or radio interface or a communication interface) configured to provide radio communications with a plurality of wireless terminals, a network interface circuit 1405 (also referred to as a network interface) configured to provide communications with other base stations of the RAN (e.g., over the X2 interface), and a processor circuit 1403 (also referred to as a processor) coupled to the transceiver circuit and the network interface circuit, and a memory circuit 1407 coupled to the processor circuit. The memory circuit 1407 may include computer readable program code that when executed by the processor circuit 1403 causes the processor circuit to perform operations according to embodiments disclosed herein. According to other embodiments, processor circuit 1403 may be defined to include memory so that a memory circuit is not separately provided.

Figure 15:
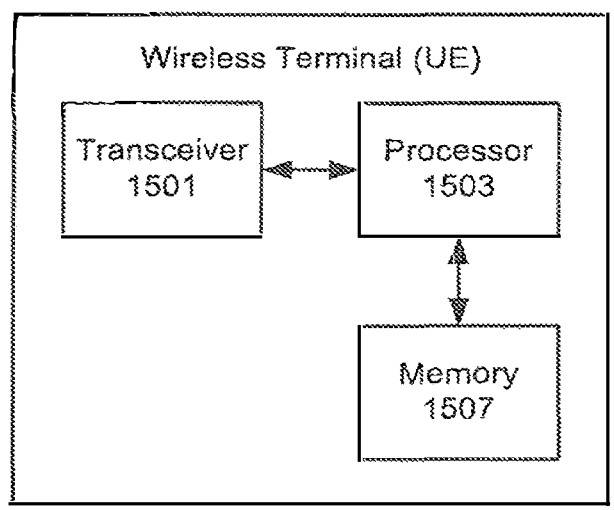
FIG. 15 is a block diagram illustrating a wireless terminal of FIG. 13 according to some embodiments of inventive concepts.

FIG. 15 is a block diagram illustrating elements of a wireless terminal UE of FIG. 13. As shown, a wireless terminal UE may include a transceiver circuit 1501 (also referred to as a transceiver) including a transmitter and a receiver configured to provide radio communications with a base station BS, a processor circuit 1503 (also referred to as a processor) coupled to the transceiver circuit, and a memory circuit 1507 coupled to the processor circuit. The memory circuit 1507 may include computer readable program code that when executed by the processor circuit 1503 causes the processor circuit to perform operations according to embodiments disclosed herein. According to other embodiments, processor circuit 1503 may be defined to include memory so that a memory circuit is not separately provided.

Figure 16:
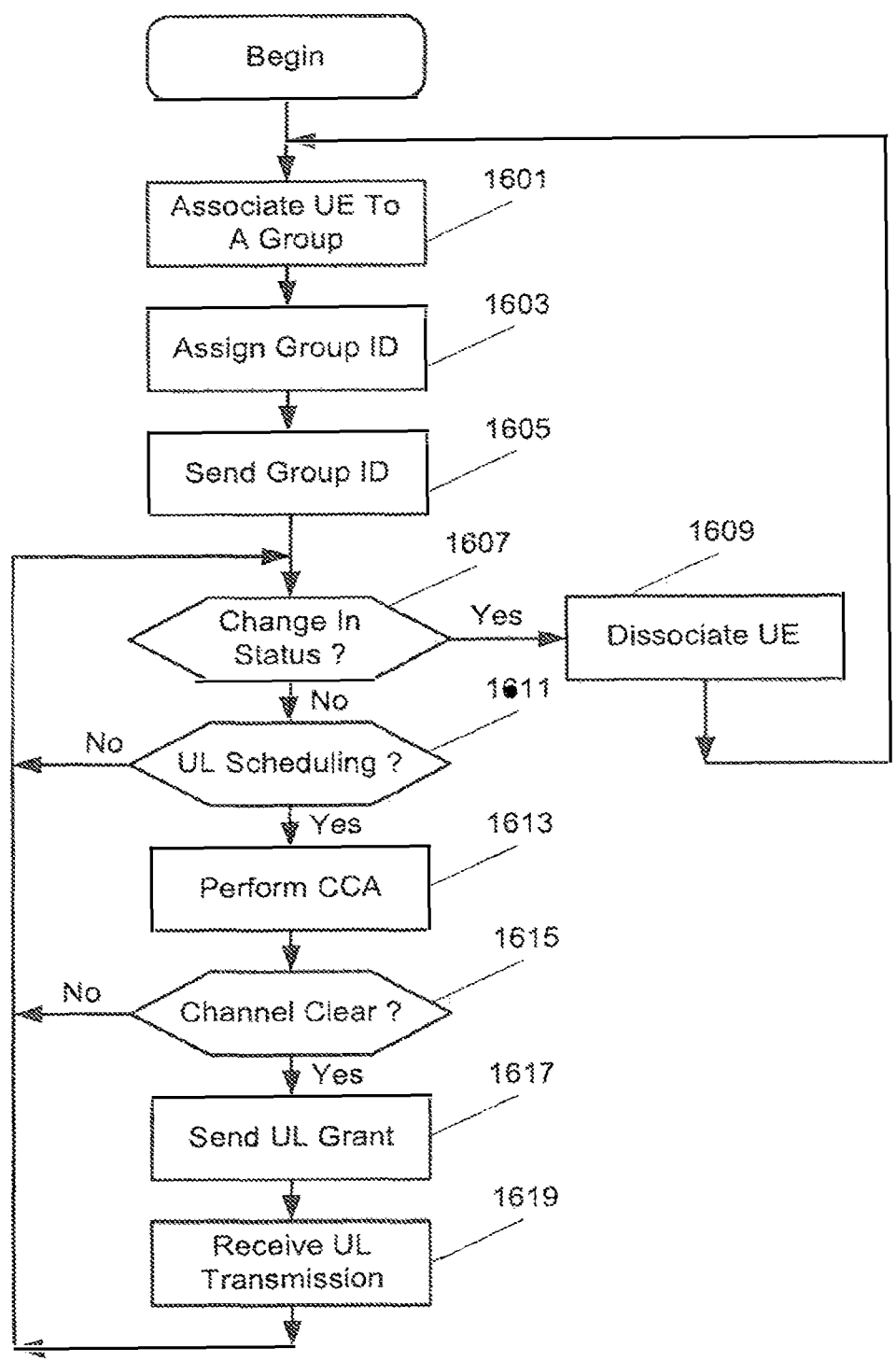

Operations of network node eNB processor 1403 according to some embodiments are illustrated in FIG. 16 for listen-before-talk (LBT) functionality in a Licensed-Assisted Access (LAA) telecommunications system. At block 1601, processor 1403 may associate a user equipment (UE) within the network node's coverage to a group of UEs. Associating user equipment (UEs) within the network node's coverage to a group of UEs may be based on at least one of a set of parameters associated with the UE. The set of parameters may include at least one of: proximity of the UE to other UEs of the group within the network node's coverage; physical locations of the UE and other UEs of the group; Radio Resource Management, RRM, and/or interference measurements of the UE; UEs within coverage of the same remote radio head (RRH); UEs within coverage of the same beam; and/or Channel State Information Reference Signal, CSI-RS, based on Reference Signal Received Power, RSRP, measurement of the UE and other UEs of the group.

Network node processor 1403 may assign a group identifier to the group of UE's, wherein the group identifier uniquely identifies the group of UE's at block 1603, and may send the group identifier to the UEs comprised in the group of UEs at block 1605. For example, the group identifier may be sent using a Downlink Control Information (DCI) signaling format.

At block 1607, network node processor 1403 may determine if there has been a change in the status of the UE based on parameters discussed above with respect to block 1601. Responsive to a change in status of the UE (e.g., the UE has moved away from other UEs of the group), network node processor 1403 may dissociate the UE from the group of UE's at block 1609.

Responsive to a request for uplink scheduling at block 1611, network node processor 1403 may perform a clear channel assessment (CCA) of an unlicensed channel for the group of UEs at block 1613. Responsive to the CCA indicating that the unlicensed channel is clear at block 1615, network node processor 1403 may send an uplink grant to the UE at block 1617 through network node transceiver 1401, and at block 1619, network node processor 1403 may receive an uplink transmission from the UE through network node transceiver 1401 based on the uplink grant.

Figure 17:
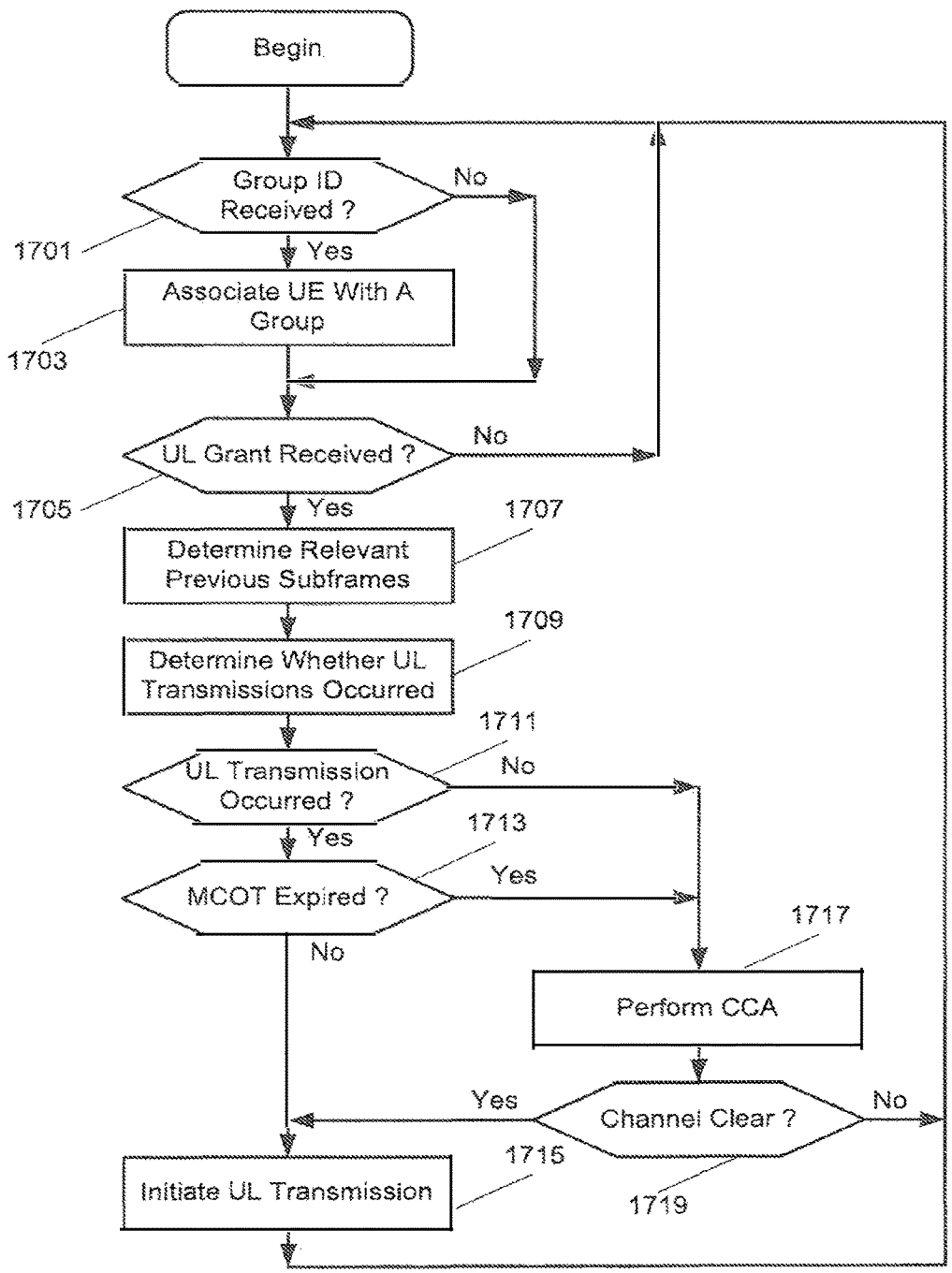

Operations of UE processor 1503 are illustrated in FIG. 17 according to some embodiments of inventive concepts with the UE providing LBT functionality and with the UE included in a group of UEs in an LAA telecommunications system. Responsive to receiving a group identifier associated with a group of UEs including the UE at block 1701 from a serving network node through UE transceiver 1501 at block 1701, UE processor 1503 may associate with other UEs of the group for purposes of CCA at block 1703.

Responsive to receiving an uplink grant from the network node at block 1705, UE processor 1503 may determine relevant subframes prior to the subframe of the uplink grant at block 1707, for example, based on information provided by the network node. At block 1709, UE processor 1503 may determine whether an uplink transmission occurred from at least one other UE comprised in the group of UEs in at least one of the previous subframes of block 1707. Determining whether an uplink transmission occurred from at least one UE comprised in the group of UEs may include determining based on the group identifier.

Responsive to an uplink transmission having occurred from at least one other UE comprised in the group of UEs in the at least one previous subframe at block 1711, UE processor 1503 may determine whether a maximum channel occupancy time has expired at block 1713. Responsive to an uplink transmission having occurred at block 1711 without the maximum channel occupancy time having expired at block 1713, UE processor 1503 may initiate/transmit an uplink transmission through UE transceiver 1501 at block 1715.

Responsive to an uplink transmission having occurred at block 1711 with the maximum channel occupancy time having expired at block 1713, UE processor 1503 may perform a clear channel assessment (CCA) of an unlicensed channel for the group of UEs at block 1717. Responsive to the CCA indicating that the unlicensed channel is clear at block 1719, UE processor 1503 may initiate an uplink transmission through UE transceiver 1501 at block 1715. Responsive to the CCA indicating that the unlicensed channel is not clear at block 1719, UE processor 1503 may wait for a next uplink grant at block 1705.

Responsive to no uplink transmission having occurred from at least one other UE comprised in the group of UEs in the at least one previous subframe at block 1711, UE processor 1503 may perform the clear channel assessment (CCA) of the unlicensed channel for the group of UEs at block 1717 before initiating an uplink transmission from the UE. As before, UE processor 1503 may initiate an uplink transmission through UE transceiver 1501 at block 1715 responsive to the CCA indicating that the unlicensed channel is clear, or UE processor 1503 may wait for a next uplink grant at block 1705 responsive to the CCA indicating that the unlicensed channel is not clear.

Accordingly, initiating an uplink transmission from the UE comprised in the group of UEs at block 1715 may include initiating the uplink transmission from the UE without performing a clear channel assessment at the UE responsive to an uplink transmission having occurred from at least one other UEs comprised in the group of UEs in the at least one previous subframe at blocks 1711 and 1713. Moreover, initiating an uplink transmission from the UE at block 1715 may require the clear channel assessment indicating that the unlicensed channel is clear at blocks 1717 and 1719 if no uplink transmission has occurred from at least one other UE comprised in the group of UEs in the at least one previous subframe.

Figure 18:
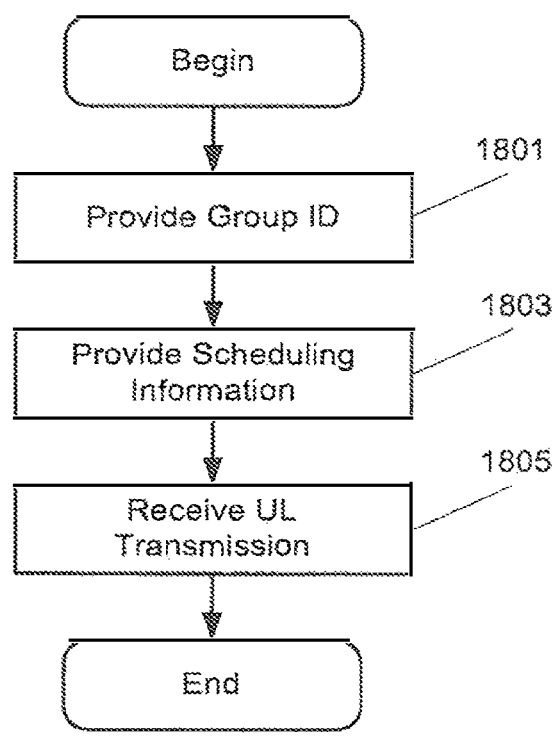

Operations of network node eNB processor 1403 according to some embodiments are illustrated in FIG. 18 for listen-before-talk (LBT) functionality in a Licensed-Assisted Access (LAA) telecommunications system. At block 1801, network node processor 1403 may provide a group identifier through network node transceiver 1401 to UEs comprised in a group of UEs including a first one of the UEs and the at least a second one of the UEs. At block 1803, network node processor 1403 may provide scheduling information through network node transceiver 1401 to a first one of the UEs comprised in the group of UEs whether at least a second one of the UEs comprised in the group of UEs is scheduled in a subframe prior a subframe in which the first one of the UEs comprised in the group of UEs is scheduled. At block 1805, network node processor 1403 may receive an uplink transmission from the first one of the UEs using the subframe in which the first one of the UEs comprised in the group of UE is scheduled.

Operations of UE processor 1503 are illustrated in FIG. 19 according to some embodiments of inventive concepts with the UE providing LBT functionality with the UE included in a group of UEs in an LAA telecommunications system. Responsive to receiving an uplink grant at block 1901 through UE transceiver 1501, UE processor 1503 may determine at block 1903 a number of subframes previous to a scheduled subframe (i.e., a subframe in which the UE is scheduled to initiate an uplink transmission with a network node) wherein the number of previous subframes are deemed relevant to CCA for the schedule subframe. At block 1905, UE processor 1503 may determine if at least one other UE comprised in the group of UEs is scheduled for uplink transmission in at least one of the subframes previous to the subframe in which at least one UE in the group UEs is scheduled to initiate an uplink transmission.

Responsive to determining that none of the other UEs comprised in the group of UEs is scheduled for uplink transmission in at least one of the number of subframes previous to the subframe in which the UE is scheduled to initiate an uplink transmission at block 1905, UE processor 1503 may perform a clear channel assessment (CCA) of an unlicensed channel for the group of UEs before initiating the uplink transmission at block 1907. Responsive to the CCA indicating that that the unlicensed channel is clear at block 1909, UE processor 1503 may initiate an uplink transmission through UE transceiver 1501 using the subframe in which the UE is scheduled to initiate the uplink transmission at block 1911.

Responsive to an uplink transmission from at least one of the group of UEs having occurred in all of the number of previous subframes at block 1905, UE processor 1503 may determine if a maximum channel occupancy time of the channel has expired at blocks 1913 and 1915. Responsive to the maximum channel occupancy time having expired at block 1915, UE processor 1503 may perform a clear channel assessment (CCA) of an unlicensed channel for the group of UEs at block 1907 before initiating the uplink transmission. Responsive to the CCA indicating that the unlicensed channel is clear at block 1909, UE processor 1503 may initiate an uplink transmission through UE transceiver 1501 using the subframe in which the UE is scheduled to initiate the uplink transmission at block 1911. Responsive to the maximum channel occupancy time having not expired at block 1915, UE processor 1503 may initiate an uplink transmission from the UE using the subframe in which the UE is scheduled to initiate the uplink transmission at block 1911 without performing CCA.

Operations of UE processor 1503 are illustrated in FIG. 20 according to some embodiments of inventive concepts with the UE providing LBT functionality and with the UE included in a group of UEs in an LAA telecommunications system. Responsive to receiving a group identifier associated with a group of UEs including the UE from a serving network node through UE transceiver 1501 at block 2000, UE processor 1503 may associate with other UEs of the group for purposes of CCA at block 2001.

Upon receiving an uplink grant at block 2002 through UE transceiver 1501, UE processor 1503 may also receive an LBT indicator at block 2003. As discussed in greater detail below, the LBT indicator may indicate that the UE has to perform LBT for a scheduled subframe or that further operations may be required to determine whether LBT is needed for a scheduled subframe.

For a first uplink grant at block 2002, for example, the first LBT indicator at block 2003 may have a first value (e.g., "0") indicating that the UE has to perform LBT for the first scheduled subframe. Responsive to the first LBT indicator having the first value, UE processor 1503 may perform a clear channel assessment of an unlicensed channel at block 2007. Responsive to the CCA indicating that the unlicensed channel is clear at block 2009, UE processor 1503 may initiate an uplink transmission through UE transceiver 1501 at block 2011 using the first scheduled subframe.

For a second uplink grant at block 2002, a second LBT indicator at block 2003 may have a second value (e.g., "1") indicating that the UE has to perform further operations to determine whether LBT is needed for the second scheduled subframe. Responsive to the second LBT indicator having the second value, UE processor 1503 may determine relevant subframes prior to the second scheduled subframe of the second uplink grant at block 2015, for example, based on information provided by the network node. At block 2017, UE processor 1503 may determine whether an uplink transmission occurred from at least one other UE in at least one relevant subframe before the second scheduled subframe. For example, the determining of block 2017 may include determining whether at least one other UE of the group of blocks 2000 and 2001 performed any uplink transmission in a relevant subframe using the group identifier. Responsive to an uplink transmission having occurred from at least one other UE in at least one relevant subframe before the second scheduled subframe at block 2019 and responsive to non-expiration of a maximum channel occupancy time at block 2021, UE processor 1503 may initiating a second uplink transmission using the second scheduled subframe at block 2011 without performing a clear channel assessment for the second scheduled subframe. Responsive to an uplink transmission having occurred from at least one other UE in at least one subframe before the second scheduled subframe at block 2019 and responsive to expiration of a maximum channel occupancy time at block 2021, UE processor may perform the clear channel assessment at blocks 2007 and 2009 before initiating a second uplink transmission using the second scheduled subframe at block 2011.

For a third uplink grant at block 2002, a third LBT indicator at block 2003 may have the second value (e.g., "1") indicating that the UE has to perform further operations to determining whether LBT is needed for the third scheduled subframe. Responsive to the third LBT indicator having the second value different than the first value, UE processor 1503 may determine relevant subframes prior to the second scheduled subframe of the second uplink grant at block 2015, for example, based on information provided by the network node. At block 2017, UE processor 1503 may determine whether an uplink transmission occurred from at least one other UE in at least one relevant subframe before the second scheduled subframe. For example, the determining of block 2017 may include determining whether at least one other UE of the group of blocks 2000 and 2001 performed any uplink transmission in a relevant subframe using the group identifier. Responsive to determining that no uplink transmission has occurred from at least one other UE in at least one relevant subframe before the scheduled subframe, UE processor 1503 may perform a clear channel assessment (CCA) of an unlicensed channel at block 2007. Responsive to the clear channel assessment indicating that the unlicensed channel is clear, UE processor 1503 may initiate an uplink transmission through UE transceiver 1501 using the third scheduled subframe.

ABBREVIATIONS

CCA Clear Channel Assessment
DL Downlink
LTE Long-Term Evolution
LAA Licensed-Assisted Access
LBT Listen Before Talk
UE User Equipment
eNB LTE base station
CSI Channel-State Information PCell Primary Cell
SCell Secondary Cell
PSS Primary Synchronization Signal
SSS Secondary Synchronization Signal
RS Reference Signal
RSRP Reference Signal Receive Power
DCI Downlink Control Information
UCI Uplink Control Information
PDCCH Physical Downlink Control Channel
PDSCH Physical Downlink Share Channel
PUCCH Physical Uplink Control Channel
PUSCH Physical Uplink Share Channel
DMRS Demodulation Reference Signals
ePDCCH Evolved Physical Downlink Control Channel

EXAMPLE EMBODIMENTS

Embodiment 1

A method for listen-before-talk (LBT) functionality by a network node in a Licensed-Assisted Access (LAA) telecommunications system, the method comprises: associating a user equipment (UE) within the network node's coverage to a group of UEs; and performing a clear channel assessment (CCA) of an unlicensed channel for the group of UEs.

Embodiment 2

The method of Embodiment 1, the method further comprises: associating user equipment (UEs) within the network node's coverage to a group of UEs associating based on a set of parameters associated with the UE.

Embodiment 3

The method of Embodiment 2, wherein the parameters comprise at least one of: UE's proximity to other UEs within the network node's coverage; or UE's physical locations; or UE's RRM measurement and/or interference measurement; or UEs within coverage of the same remote radio head (RRH); or UEs within coverage of the same beam; or UE's CSI-RS based on RSRP measurement.

Embodiment 4

The method of any of Embodiments 1-3, wherein the method further comprises: assigning a group identifier to the group of UEs, wherein the group identifier uniquely identifies the group of UEs; and sending the group identifier to the UEs comprised in the group of UEs using a signaling format such as a DCI format.

Embodiment 5

The method of any of Embodiments 1-4, wherein the method further comprises: dissociating the UE from the group of UEs based on the at least one parameter associated with the UE.

Embodiment 6

A method in a network node for listen-before-talk (LBT) functionality for a group of UEs in a Licensed-Assisted Access (LAA) telecommunications system, the method comprises: determining whether a uplink transmission occurred from at least one UE comprised in the group UEs in at least one previous subframe; and if uplink transmission occurred in the least one previous subframe: initiating an uplink transmission from at least one UE comprised in the group of UEs; otherwise performing a clear channel assessment (CCA) of an unlicensed channel for the group of UEs.

Embodiment 7

The method of Embodiment 6, the method further comprises: determining whether the maximum channel occupancy time has expired, and if the maximum channel occupancy time has expired: performing a clear channel assessment (CCA) of an unlicensed channel for the group of UEs; otherwise initiating an uplink transmission from at least one UE comprised in the group of UEs.

Embodiment 8

A method in a network node for listen-before-talk (LBT) functionality for a group of UEs in a Licensed-Assisted Access (LAA) telecommunications system, the method comprises: providing information to at least one of the UEs comprised in the group of UEs whether at least one other of the UEs comprised in the group of UEs is scheduled in a subframe prior the subframe in which the least one of the UEs comprised in the group of UEs is scheduled; and if at least one other of the UEs comprised in the group of UEs is scheduled in a subframe prior the subframe in which the least one of the UEs comprised in the group of UEs is scheduled: initiating an uplink transmission from the at least one of the UEs comprised in the group of UEs; otherwise: performing a clear channel assessment (CCA) of an unlicensed channel for the group of UEs.

Embodiment 9

A method in a UE, comprised in a group of UEs, for listen-before-talk (LBT) functionality in a Licensed-Assisted Access (LAA) telecommunications system, the method comprises: determining the number of subframes previous to a subframe in which the UE is scheduled to initiate an uplink transmission with a network node; determining if at least one other UE comprised in the group of UEs is scheduled for uplink transmission in at least one of in the subframes previous to the subframe in which at least one UE in the group UEs is scheduled to initiate an uplink transmission; and initiating an uplink transmission from UE.

Embodiment 10

A method of Embodiment 9, further comprising, if at least one other UE is not scheduled for is the uplink transmission in at least one of in the subframes previous to the subframe in which at least one UE in the group UEs is scheduled to initiate an uplink transmission: performing a clear channel assessment (CCA) of an unlicensed channel for the group of UEs.

Embodiment 11

A method of any of Embodiments 9-10, further comprising, if uplink transmission from the group of UEs occurred in all of the previous subframes: determining the if the maximum channel occupancy time of the channel has expired; and performing a clear channel assessment (CCA) of an unlicensed channel for the group of UEs.

Further Definitions

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. A method for listen-before-talk (LBT) functionality by a network node in a telecommunications system, the method comprising:

associating a user equipment (UE) within the network node's coverage to a group of UEs;

performing a clear channel assessment (CCA) of an unlicensed channel for the group of UEs; and responsive to performing the CCA, communicating information to the UE that indicates another UE of the group is scheduled for uplink transmissions to the node in a subframe prior to the subframe in which the UE is scheduled for uplink transmissions to the node, wherein communicating the information comprises communicating an indicator in the downlink control information transmitted to the UE that indicates the another UE of the group is scheduled for uplink transmissions to the node in a subframe prior to the subframe in which the UE is scheduled for uplink transmissions to the node.

2. The method of claim 1, wherein associating user equipment (UEs) within the network node's coverage to a group of UEs comprises associating based on at least one of a set of parameters associated with the UE.

3. The method of claim 2, wherein the set of parameters comprises at least one of:
proximity of the UE to other UEs of the group within the network node's coverage; or
physical locations of the UE and other UEs of the group; or
Radio Resource Management, RRM, and/or interference measurements of the UE; or
UEs within coverage of the same remote radio head (RRH); or
UEs within coverage of the same beam; or
Channel State Information Reference Signal, CSI-RS, based on Reference Signal Received Power, RSRP, measurement of the UE and other UEs of the group.

4. The method of claim 2, the method further comprising:
dissociating the UE from the group of UEs based on the at least one of the set of parameters associated with the UE.

5. The method of claim 1, the method further comprising:
assigning a group identifier to the group of UEs, wherein the group identifier uniquely identifies the group of UEs; and
sending the group identifier to the UEs comprised in the group of UEs.

6. The method of claim 5 wherein sending the group identifier comprises sending the group identifier using a Downlink Control Information, DCI, signaling format.

7. The method of claim 1, the method further comprising:
responsive to the CCA indicating that the unlicensed channel is clear, sending an uplink grant to the UE; and
receiving an uplink transmission from the UE based on the uplink grant.

8. The method of claim 1 wherein the telecommunications system is a Licensed-Assisted Access (LAA) telecommunications system.

9. A method in a UE for listen-before-talk (LBT) functionality, wherein the UE is included in a group of UEs in a telecommunications system, the method comprising:
determining at the UE whether an uplink transmission occurred from at least one other UE comprised in the group UEs in at least one previous subframe;
responsive to an uplink transmission having occurred from at least one other UE comprised in the group of UEs in the at least one previous subframe, initiating an uplink transmission from the UE comprised in the group of UEs; and
responsive to no uplink transmission having occurred from at least one other UE comprised in the group of UEs in the at least one previous subframe, performing a clear channel assessment (CCA) of an unlicensed channel for the group of UEs before initiating an uplink transmission from the UE,
wherein determining at the UE whether the uplink transmission occurred from the at least one other UE comprises determining the uplink transmission occurred from the at least one other UE based on information received from a node of the telecommunication system, the information indicating that the at least one other UE is scheduled for uplink transmissions to the node in a subframe prior to the subframe in which the UE is scheduled for uplink transmissions to the node.

10. The method of claim 9, the method further comprising:
determining whether the maximum channel occupancy time has expired, and if the maximum channel occupancy time has expired:
performing a clear channel assessment (CCA) of an unlicensed channel for the group of UEs; otherwise
initiating an uplink transmission from at least one UE comprised in the group of UEs.

11. The method of claim 9, wherein initiating an uplink transmission from the UE comprised in the group of UEs comprises initiating the uplink transmission from the UE without performing a clear channel assessment at the UE responsive to an uplink transmission having occurred from at least one other UE comprised in the group of UEs in the at least one previous subframe.

12. The method of claim 9, further comprising:
responsive to no uplink transmission having occurred from at least one other UE comprised in the group of UEs in the at least one previous subframe and responsive to the clear channel assessment indicating that the unlicensed channel is clear, initiating an uplink transmission from the UE.

13. The method of claim 9, the method further comprising:
receiving a group identifier wherein the group identifier is associated with the group of UEs including the UE;
wherein determining whether an uplink transmission occurred from at least one UE comprised in the group of UEs comprises determining based on the group identifier.

14. The method of claim 9 wherein the telecommunications system is a Licensed-Assisted Access (LAA) telecommunications system.

15. The method of claim 9, wherein the uplink transmission from the UE is a first uplink transmission from the UE, wherein the determining comprises determining that an uplink transmission occurred from at least one other UE in the group UEs in at least one previous subframe before the first uplink transmission from the UE, and wherein initiating comprises initiating the first uplink transmission from the UE without performing a CCA for the first uplink transmission responsive to determining that the uplink transmission occurred from the at least one other UE in at least one previous subframe before the first uplink transmission from the UE.

16. The method of claim 15, the method further comprising:
determining at the UE that an uplink transmission has not occurred from at least one other UE in the group of UEs in at least one previous subframe before a second uplink transmission from the UE;
responsive to determining that no uplink transmission has occurred from at least one other UE comprised in the group of UEs in the at least one previous subframe before the second uplink transmission from the UE, performing a clear channel assessment for the second uplink transmission; and after performing the CCA for the second uplink transmission, initiating the second uplink transmission from the UE.

17. A method in a network node for listen-before-talk (LBT) functionality for a group of UEs in a telecommunications system, the method comprises:
   providing information to a first one of the UEs comprised in the group of UEs whether at least a second one of the UEs comprised in the group of UEs is scheduled for uplink transmissions to the node in a subframe prior the subframe in which the first one of the UEs comprised in the group of UEs is scheduled for uplink transmissions to the node,
   wherein providing the information comprises providing an indicator in the downlink control information transmitted to the UE that indicates the another UE of the group is scheduled for uplink transmissions to the node in a subframe prior to the subframe in which the UE is scheduled for uplink transmissions to the node.

18. The method of claim 17, the method further comprising:
   providing a group identifier to the UEs comprised in the group of UEs including the first one of the UEs and the at least a second one of the UEs.

19. The method of claim 17, the method further comprising:
   after providing the information, receiving an uplink transmission from the first one of the UEs using the subframe in which the first one of the UEs comprised in the group of UE is scheduled.

20. The method of claim 17 wherein the telecommunications system is a Licensed-Assisted Access (LAA) telecommunications system.

21. A method in a UE, comprised in a group of UEs, for listen-before-talk (LBT) functionality in a telecommunications system, the method comprising:
   determining a number of subframes previous to a subframe in which the UE is scheduled to initiate an uplink transmission with a network node;
   determining at least one other UE comprised in the group of UEs is scheduled for uplink transmission in at least one of the subframes of the determined number of subframes previous to the subframe in which at least one UE in the group UEs is scheduled to initiate an uplink transmission; and
   responsive to determining the at least one UE comprised in the group of UEs is scheduled for uplink transmission in the at least one of the subframes, initiating an uplink transmission from the UE using the subframe in which the UE is scheduled to initiate the uplink transmission,
   wherein determining the at least one other UE comprised in the group of UEs is scheduled for uplink transmission in at least one of the subframes of the determined number of subframes comprises determining the at least one other UE comprised in the group of UEs is scheduled for uplink transmission in at least one of the subframes of the determined number of subframes based on information received from a node of the telecommunication system, the information indicating that the at least one other UE is scheduled for uplink transmissions to the node in at least one of the subframes of the determined number of subframes previous to the subframe in which the UE is scheduled for uplink transmissions to the node.

22. The method of claim 21, further comprising:
   responsive to determining that none of the other UEs comprised in the group of UEs is scheduled for uplink transmission in at least one of the number of subframes previous to the subframe in which the UE is scheduled to initiate an uplink transmission, performing a clear channel assessment (CCA) of an unlicensed channel for the group of UEs before initiating the uplink transmission.

23. The method of claim 21, further comprising:
   responsive to an uplink transmission from at least one of the group of UEs having occurred in all of the number of previous subframes, determining if a maximum channel occupancy time of the channel has expired; and
   responsive to the maximum channel occupancy time having expired, performing a clear channel assessment (CCA) of an unlicensed channel for the group of UEs before initiating the uplink transmission.

24. The method of claim 21 wherein the telecommunications network is a Licensed-Assisted Access (LAA) telecommunications network.

* * * * *